United States Patent
Nakata

(10) Patent No.: US 7,986,453 B2
(45) Date of Patent: Jul. 26, 2011

(54) RAMAN AMPLIFIER FOR AMPLIFYING SIGNAL LIGHT FOR OPTICAL COMMUNICATION, OPTICAL COMMUNICATION SYSTEM EQUIPPED WITH RAMAN AMPLIFIER, AND METHOD FOR CONTROLLING RAMAN AMPLIFIER

(75) Inventor: Masao Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 896 days.

(21) Appl. No.: 11/892,531

(22) Filed: Aug. 23, 2007

(65) Prior Publication Data
US 2008/0049303 A1     Feb. 28, 2008

(30) Foreign Application Priority Data
Aug. 24, 2006   (JP) ................. 2006-227465

(51) Int. Cl.
*H04B 10/17*     (2006.01)
*H04B 10/12*     (2006.01)
(52) U.S. Cl. ...................................... 359/334
(58) Field of Classification Search ............ 359/334
See application file for complete search history.

(56) References Cited

U.S. PATENT DOCUMENTS

| | | | |
|---|---|---|---|
| 6,292,288 B1 | 9/2001 | Akasaka et al. | |
| 6,441,950 B1 * | 8/2002 | Chen et al. | 359/334 |
| 6,501,593 B2 * | 12/2002 | Akasaka et al. | 359/341.31 |
| 6,611,370 B2 * | 8/2003 | Namiki et al. | 359/334 |
| 6,624,926 B1 | 9/2003 | Hayashi et al. | |
| 6,785,042 B1 | 8/2004 | Onaka et al. | |
| 2001/0019448 A1 * | 9/2001 | Yokoyama | 359/334 |
| 2006/0001950 A1 * | 1/2006 | Fujimura et al. | 359/334 |

FOREIGN PATENT DOCUMENTS

| JP | 2000-098433 | 4/2000 |
|---|---|---|
| JP | 2001-007768 | 1/2001 |
| JP | 2002-072262 | 3/2002 |

* cited by examiner

*Primary Examiner* — Eric Bolda
(74) *Attorney, Agent, or Firm* — Staas & Halsey LLP

(57) ABSTRACT

A Raman amplifier that amplifies a signal light intensity by using a Raman amplification effect of an optical fiber transmission channel has an excitation unit that supplies excitation lights of a plurality of wavelengths to the optical fiber transmission channel and performs Raman amplification, a signal light monitor that monitors the signal light intensity of each wavelength contained in the signal light that is Raman amplified, an output light intensity deviation monitoring circuit that finds a deviation in the intensity of each signal light detected by the signal light monitor, and an excitation light control circuit that controls an excitation light intensity from excitation light sources of each wavelength constituting the excitation unit so as to correspond to a predetermined characteristic based on a deviation of the intensity of signal light found by the output light intensity deviation monitoring circuit.

14 Claims, 22 Drawing Sheets

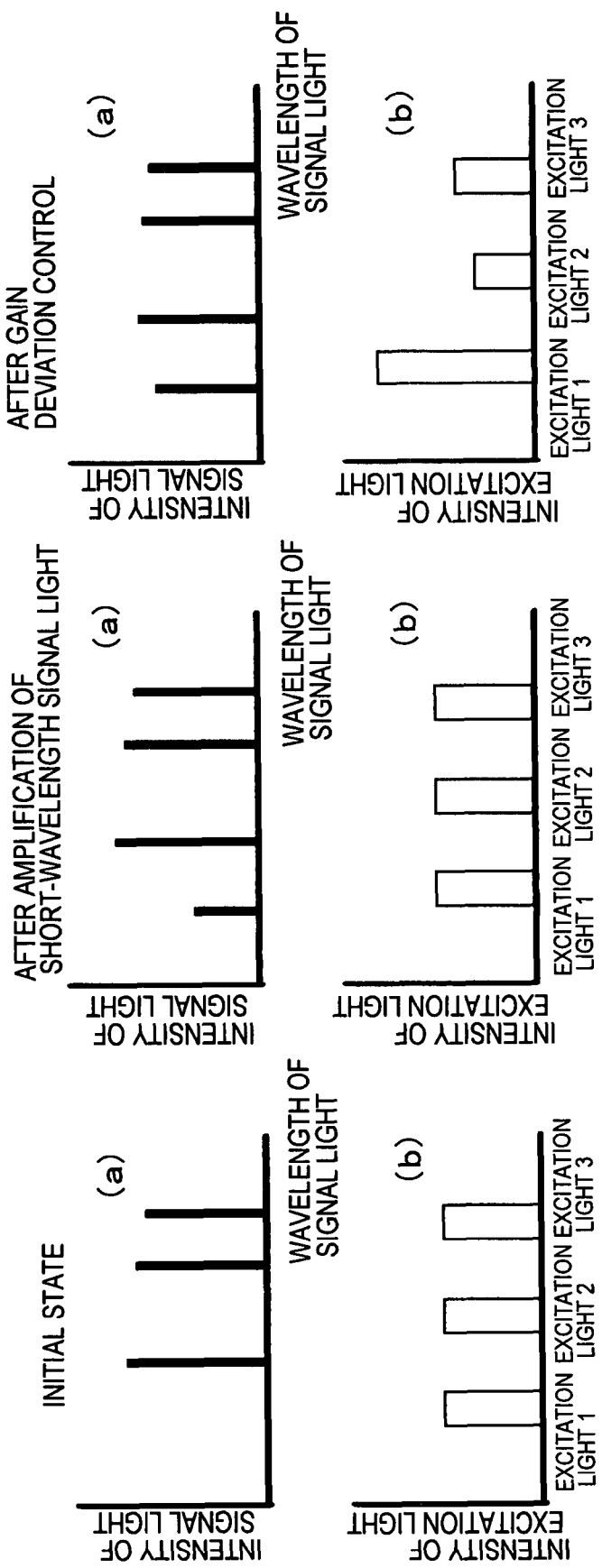

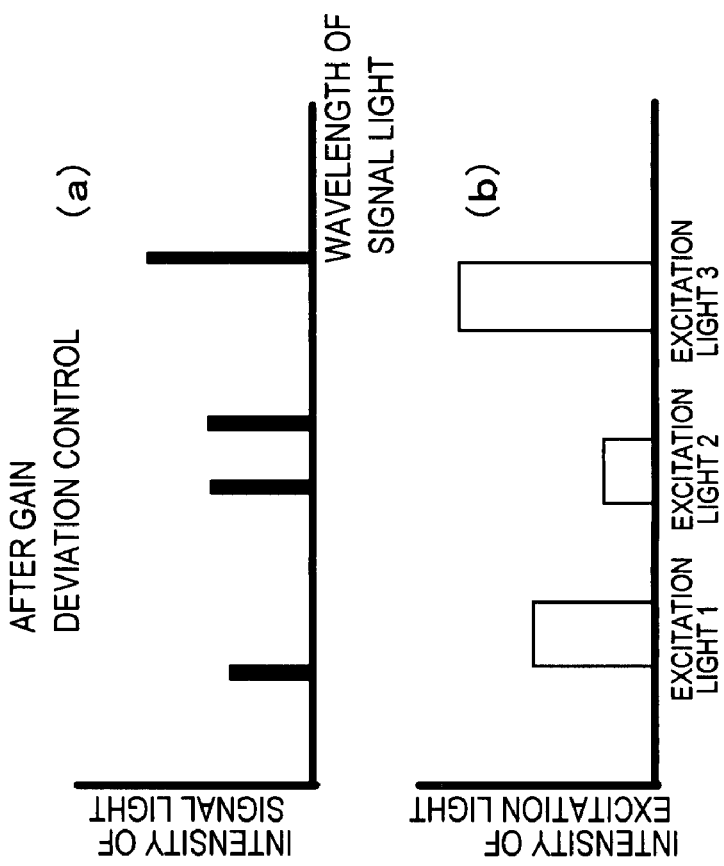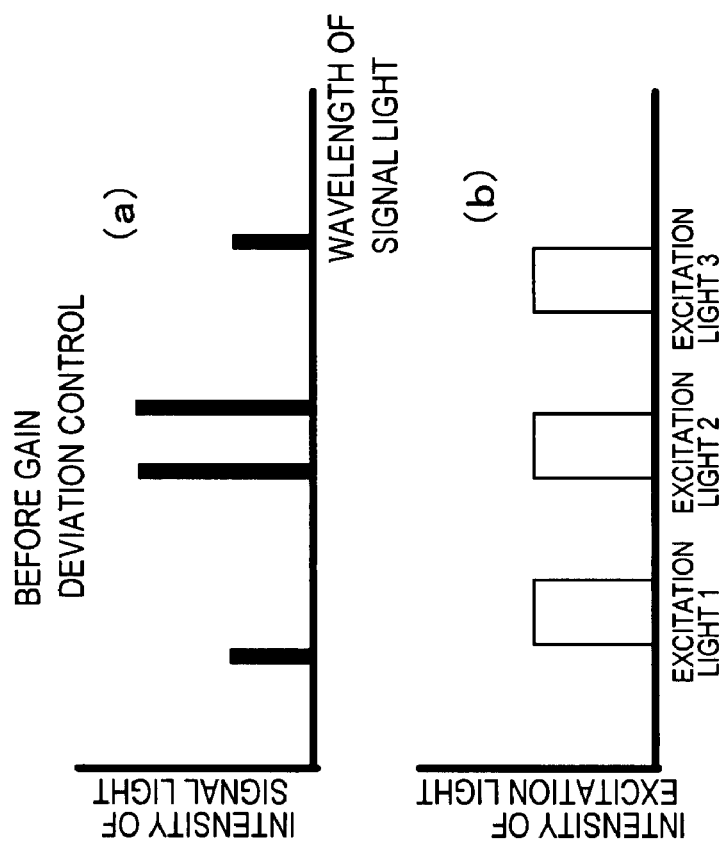

BEFORE GAIN DEVIATION CONTROL

AFTER GAIN DEVIATION CONTROL

OPTICAL ATTENUATION QUANTITY

RAMAN AMPLIFIER FOR AMPLIFYING SIGNAL LIGHT FOR OPTICAL COMMUNICATION, OPTICAL COMMUNICATION SYSTEM EQUIPPED WITH RAMAN AMPLIFIER, AND METHOD FOR CONTROLLING RAMAN AMPLIFIER

CROSS-REFERENCE TO RELATED APPLICATIONS

This application is based upon and claims the benefit of priority from the prior Japanese Patent Application No. 2006-227465, filed on Aug. 24, 2006, the entire contents of which are incorporated herein by reference.

BACKGROUND OF THE INVENTION

1. Field of the Invention

The present invention relates to a Raman amplifier for amplifying signal light for optical communication, an optical communication system equipped with the Raman amplifier, and a method for controlling the Raman amplifier.

2. Description of the Related Art

Wavelength division multiplex transmission technology for transmitting a high-density information volume by amplifying signal light of a plurality of wavelengths in a batch mode is employed for creating a network of a long-distance transmission optical communication system suitable for high-volume communication.

A Raman amplifier is used for realizing a long-distance optical transmission system with excellent signal-noise characteristic in the wavelength division multiplexing transmission technology. A Raman amplifier is an amplifier that uses an optical fiber as an amplification medium by being incident a high-intensity excitation light into an optical fiber transmission channel.

The Raman amplifier uses a physical phenomenon according to which when an excitation light of a certain wavelength is incident into an optical fiber, such as shown in FIG. 1, a Raman amplification effect is produced in a long wavelength band of about 100 nm with respect to the wavelength of the excitation light. In the example shown in FIG. 1, Raman gains 1, 2, 3 are generated by the excitation lights 1, 2, 3.

In the case of quartz glass used for an optical fiber, the maximum amplification characteristic is obtained in a wavelength region less than about 13.2 THz with respect to the wavelength of the excitation light. Therefore, for example, when a signal light close to 1550 nm is Raman amplified, a Raman gain can be obtained with good efficiency if an excitation light with a wavelength of about 1450 nm is used.

In a communication system that requires signal light in a wide wavelength region, such as that of wavelength division multiplexing transmission, to be amplified in a batch mode, an amplification characteristic in a wide wavelength band corresponding to the intensity and wavelength of the excitation light can be obtained by using excitation light of a plurality of types with mutually different wavelengths and controlling the intensity of each excitation light.

Further, a specific feature of the Raman amplifier that realizes a long-distance optical transmission system is that the amplifier has the following two functions.

(1) A Raman amplification function according to which the intensity of excitation light is regulated so as to obtain the predetermined gain, while monitoring the intensity of the signal light, with the object of compensating optical loss of the signal light that takes place when the signal light passes through the optical fiber and obtaining good transmission characteristic, and (2) a gain deviation control function according to which the intensity of excitation light corresponding to the amplification band of each excitation light wavelength is controlled by using the principle explained with reference to FIG. 1 and a deviation of the signal light intensity after Raman amplification is controlled to the predetermined characteristic in order to compensate the gain deviation of light amplifiers connected in a multistage mode and a wavelength characteristic of optical loss in the optical fiber and the like.

In Raman amplification, the Raman amplification gain of the signal light intensity corresponding to the amplification band of the excitation light wavelength is known to increase proportionally to the intensity of the excitation light incident into the optical fiber. By incident excitation light of a plurality of wavelengths into the optical fiber, it is possible to expand the amplification band of the signal light and amplify the signal light intently in a wide range in a batch mode.

As shown in FIG. 1, excitation lights 1, 2, 3 that have different wavelengths are assumed to have Raman amplification bands in the wavelength bands shown by Raman gains 1, 2, 3. When the intensity of the excitation light 1 is high, the amplification gain of the Raman gain 1 is high, when the intensity of the excitation light 2 is high, the amplification gain of the Raman gain 2 is high, and when the intensity of the excitation light 3 is high, the amplification gain of the Raman gain 3 is high.

For example, let us consider the case where the signal light intensity of the wavelength band of Raman gain 1 is higher than the signal light intensity of the bands of Raman gains 2, 3, and the signal light intensity of the wavelength band of Raman gain 3 is lower than the signal light intensity of the bands of Raman gains 1, 2. By realizing the gain deviation control function of clause (2) above, the intensity of excitation light 1 is suppressed so as to decrease the Raman gain of the signal light intensity of Raman gain 1, whereas the intensity of excitation light 3 is increased so as to increase the Raman gain of signal light intensity of Raman gain 3, and the wavelength characteristic of the signal light intensity of Raman gains 1, 2, 3 is flattened.

A method for implementing the gain deviation control of the Raman amplifier will be explained below.

A configuration example of the Raman amplifier for implementing the gain deviation control is shown in FIG. 2.

The Raman amplifier shown in FIG. 2 has a group of excitation light sources including light sources 11a, 11b, 11c of excitation light with different wavelengths in a Raman amplification unit 1, a complete signal light monitoring circuit 14 for use in controlling the Raman amplification gain, and an excitation light control circuit 15.

Referring to FIG. 2, the excitation lights of the excitation light sources 11a, 11b, 11c are multiplexed in a multiplexer 10 and outputted into an optical fiber transmission channel 2. On the other hand, a wavelength multiplexed optical signal outputted from the optical fiber transmission channel 2 is branched by a branching device 12 to a rear stage side and to the complete signal light monitoring circuit 14 and signal light monitors 21a, 21b-21n for each wavelength.

As for the detection signal that is detected by a photodetection element 13 and converted into an electric signal, the intensity of the signal light in a wide band that was optically amplified in a batch mode is monitored by the complete signal light monitoring circuit 14, and the sum total of excitation light intensities is controlled so that the output of the detection signal has a desired gain in the gain amount monitoring unit 15a of the excitation light control circuit 15.

The configuration shown in FIG. 2 additionally has a signal light branching unit 20 such as an optical branching unit of an array waveguide grating type that branches the signal light intensities with different wavelengths to monitor the deviation of signal light intensity after Raman amplification and a plurality of signal light monitors 21a, 21b-21n that monitor the light intensity of respective wavelength signals separated for each wavelength by the signal light branching unit 20.

As for the signal light intensity monitored by the signal light monitors 21a, 21b-21n, the gain deviation amount is monitored with the gain deviation monitoring circuit 22 and used for calculating the excitation light ratio of excitation light sources 11a, 11b, 11c of different wavelength of the Raman amplifier in the excitation light ratio calculation unit 15b.

By controlling the intensity of excitation lights outputted from a plurality of excitation light sources 11a, 11b, 11c with different wavelengths of a group of excitation light sources by the output of the excitation light ratio calculation unit 15b, the signal light of an amplification band corresponding to the excitation light wavelength is Raman amplified.

Thus, with the conventional configuration shown in FIG. 2, in the excitation light control circuit 15, the gain amount found by the gain amount monitoring unit 15a from the signal light level monitored by the complete signal light monitoring circuit 14 is monitored and the predetermined Raman gain is controlled. In addition, the wavelength deviation of the signal light intensity after Raman amplification is monitored and the excitation light intensity of each wavelength is set.

In an optical transmission system in which light amplifiers are continuously connected in a multistage fashion, a gain deviation is mainly caused by the following two factors.

(a) Loss per Unit Distance of the Optical Fiber Transmission Channel

The optical fiber has a wavelength characteristic of optical loss per unit distance. Even if a signal light with an intensity deviation of zero before the transmission in the optical fiber is transmitted in the optical fiber of a large length, the intensity deviation occurs in the signal light after the transmission in the optical fiber due to optical loss in the optical fiber.

(b) Cumulative Gain Deviation of Light Amplifier

For example, a light amplifier using an erbium-doped optical fiber as an amplification medium has a gain equalizer for canceling the wavelength characteristic of amplification efficiency of the amplification medium. Further, in most cases the gain deviation per one light amplifier can be suppressed, but in a system in which light amplifiers are sequentially connected in a multistage fashion, the wavelength characteristic of gain per one device sometimes accumulates.

FIG. 3 shows the adjacent transmission and reception light amplifiers 3, 4 connected to the optical fiber serving as the transmission channel 2 in the optical transmission system in which light amplifiers are sequentially connected in the multistage fashion.

FIG. 4 (FIGS. 4A-4D) shows spectra of signal light where intensity deviation has occurred due to the above-mentioned factors (a) and (b) in the connection diagram of the light amplifiers 3, 4 and optical fiber 2 shown in FIG. 3.

FIG. 4A shows the amplification efficiency of the amplification medium of the transmission light amplifier 3 and the intensity of the output signal light of the transmission light amplifier 3 obtained after the light has passed through a gain equalizer that cancels the gain deviation.

FIG. 4B shows a wavelength characteristic of optical loss of the optical fiber 2 that transmits the signal light.

FIG. 4C shows the amplification efficiency of the amplification medium of the reception light amplifier 4 and the gain deviation of the reception light amplifier 4 obtained after the light has passed through the gain equalizer that cancels the gain deviation.

FIG. 4D shows the deviation of signal light intensity after the light has passes through all the reception and transmission light amplifiers 3, 4 and optical fiber 2 of FIGS. 4A-4C. FIG. 4D shows a mode in which as a result of combining wavelength characteristics of gain deviation of light amplifiers 3, 4 and optical loss of the optical fiber 2, the intensity of signal light increased at a wavelength close to the center of the signal band, but the intensity of signal light at the small wavelength side is decreased with respect to the average intensity.

FIG. 5 (FIG. 5A to FIG. 5C) shows an example of the gain deviation control that flattens the wavelength characteristic of the intensity of signal light that accumulated as described hereinabove.

FIG. 5A shows a wavelength arrangement and spectrum of signal light in the initial state (a) and the intensity of excitation light of the Raman amplifier (b) in the upper and lower sections of the figure, respectively.

In the initial state, a signal light (FIG. 5A, (a)) is obtained in which intensity deviation is inhibited by the intensity of excitation light (FIG. 5A, (b)) provided from the Raman amplifier.

FIG. 5B shows a spectrum of the signal light in which the signal light at a short wavelength side was augmented from the initial state and an intensity deviation has occurred. The intensity of excitation light of the Raman amplifier at this time does not change with respect to that of the initial state shown in FIG. 5A (FIG. 5B, (b)). A state in which due to the factors shown in FIGS. 4A to 4D, a signal light with an intensity lower than the average intensity of signal light has been added to the small wavelength side and a deviation has occurred in the intensity of signal light is shown in FIG. 5B, (a).

FIG. 5C shows a spectrum of signal light in which the wavelength characteristic of the signal light intensity was flattened by further implementing the gain deviation control from the state shown in FIG. 5B (FIG. 5C, (a)) and the intensity of excitation light of the Raman amplifier (FIG. 5C, (b)).

In the gain deviation control, the intensity of excitation light of the excitation lights 1, 2, 3 or the intensity ratio of excitation lights is varied so as to inhibit the deviation of the signal light intensity after Raman amplification. As a result, the intensity of the excitation light 1 is raised and the Raman gain of the short-wavelength signal is increased, whereas the intensity of excitation lights 2, 3 is decreased and the Raman gain of signals of other wavelengths is inhibited (FIG. 5C, (b)).

By implementing the gain deviation control explained with reference to FIG. 5A to FIG. 5C, a good transmission characteristic with a small intensity deviation of signal light of each wavelength can be obtained even in an optical transmission system with a multistage connection.

It was suggested to employ a configuration that uses excitation light sources of a plurality of wavelengths when a signal light of a wide band is Raman amplified by using a Raman amplifier. The inventions described in Japanese Patent Applications Laid-open No. 2000-98433, 2001-7768, 2002-72262 are known as the inventions relating to gain deviation control of a Raman amplifier using excitation light sources of a plurality of wavelengths.

FIG. 6 (FIG. 6A, FIG. 6B) illustrates a problem arising when the gain deviation control is implemented by using the invention described in Japanese Patent Application Laid-open No. 2000-98433.

FIG. 6A, (a) shows a state in which a signal light with an intensity lower than the average intensity of signal light is on the short wavelength side and long wavelength side, but a signal light with a high intensity is close to the center of the wavelength band, and a gain deviation occurs.

In this case, FIG. 6B shows the excitation light intensity (b) and signal light intensity (a) obtained by performing Raman amplification after implementing the gain deviation control from the state shown in FIG. 6A.

A specific feature of the invention described in Japanese Patent Application Laid-open No. 2000-98433 is that the gain deviation control is implemented separately for two groups with different wavelengths of excitation light source, and the control increases the excitation light power of one group and decreases the excitation light power of the other group.

As a result, in Raman amplification having an amplification band corresponding to the wavelength of the excitation light, the deviation of signal light intensity can be eliminated when the signal light intensity increases monotonously or decreases monotonously with respect to the signal light wavelength.

However, in the case where a signal light with a low intensity is on the short wavelength side and long wavelength side, but a signal light with a high intensity is close to the center of the wavelength band as shown in FIG. 6A, the intensity deviation shown in FIG. 6A cannot be eliminated, as shown in FIG. 6B, and gain deviation control is impossible.

FIG. 7 illustrates a problem arising when a gain deviation control is implemented by using the invention described in Japanese Patent Application Laid-open No. 2001-7768.

The gain deviation occurrence state shown in FIG. 7A is identical to that shown in FIG. 6A. FIG. 7B shows the excitation light intensity (FIG. 7, (b)) and signal light intensity obtained by performing Raman amplification after implementing the gain deviation control from the state shown in FIG. 7A.

The invention described in Japanese Patent Application Laid-open No. 2001-7768 also includes a configuration divided into three or more groups according to the excitation light wavelength, and when a gain deviation control is performed, the excitation light power of at least one wavelength band is fixed and the excitation light power of the other wavelength bands is controlled. For example, in a Raman amplifier composed of three or more groups of excitation light sources, a control is performed such that when the power of excitation light 1 is fixed and the power of excitation light 2 and excitation light 3 is regulated due to the deviation of signal light intensity having an extremum point shown in FIG. 7A, the intensity of excitation light 2 is decreased, whereas the intensity of excitation light 3 is increased.

In this case, as shown in FIG. 7B, the intensity is increased by the excitation light 3 and the intensity deviation obviously remains.

Further, FIG. 8 (FIG. 8A, FIG. 8B) illustrates a problem arising when a gain deviation control is implemented by using the invention described in Japanese Patent Application Laid-open No. 2002-72262.

The gain deviation occurrence state shown in FIG. 8A is also identical to that shown in FIG. 6A. FIG. 8B shows the excitation light intensity and signal light intensity obtained by performing Raman amplification after implementing the gain deviation control from the state shown in FIG. 8A.

The invention described in Japanese Patent Application Laid-open No. 2002-72262 also includes a configuration divided into three or more groups according to the excitation light wavelength. With such control, the variation amount of the power of each excitation light that eliminates the gain deviation is calculated and adjusted from matrix elements that increase and decrease the power of the excitation light of each wavelength according to the intensity deviation from the average signal intensity.

For example, in a Raman amplifier composed of three or more groups of excitation light sources, with the deviation of signal light intensity that has an extremum point shown in FIG. 8A, the gain deviation is eliminated by increasing the power of excitation lights 1, 3 and decreasing the power of excitation light 2.

With the invention described in Japanese Patent Application Laid-open No. 2002-72262, the wavelength characteristic can be flattened by eliminating the intensity deviation of individual signal lights, but the average power of the entire configuration fluctuates.

Thus, all the inventions described in Japanese Patent Applications Laid-open No. 2000-98433, 2001-7768, 2002-72262 and serving as prior art have the aforementioned problems associated with the gain deviation control performed to flatten the wavelength characteristic of signal light intensity.

Thus, in the invention described in Japanese Patent Application Laid-open No. 2000-98433, in Raman amplification having an amplification band corresponding to the wavelength of excitation light, the deviation of signal light intensity can be eliminated when the signal light intensity tends to increase monotonously or decrease monotonously with respect to the signal light wavelength. However, in the case of deviation of signal light intensity that has an extremum point shown in FIG. 6A, the deviation of signal light intensity is difficult to eliminate.

Further, in the invention described in Japanese Patent Application Laid-open No. 2001-7768, in the Raman amplifier composed of three or more groups of excitation light sources, the Raman gain in the vicinity of the center of the signal light band corresponding to the excitation light 2 is inhibited, whereas the Raman gain corresponding to the excitation light 3 is increased, whereby the deviation of signal light intensity at the short wavelength side of the wavelength band and close to the center thereof is eliminated, but the signal light intensity at the long wavelength side is increased and the deviation of signal light intensity cannot be eliminated.

Further, in the invention described in Japanese Patent Application Laid-open No. 2002-72262, the variation amounts of excitation lights 1, 2, 3 are set, but the sum total thereof is not controlled. The resultant problem is that the average signal light intensity before the gain deviation control is different from that after the control.

SUMMARY OF THE INVENTION

Accordingly, it is an object of the present invention to provide a Raman amplifier for amplifying signal light for optical communication that resolves the problems associated with implementation of the inventions described in Japanese Patent Applications Laid-open No. 2000-98433, 2001-7768, 2002-72262, an optical communication system equipped with the Raman amplifier, and a method for controlling the Raman amplifier.

In accordance with the present invention, there is provided a control unit that can perform the output signal light constant control, Raman gain constant control, and gain deviation control such that when Raman amplification is performed, the band is widened by using a plurality of groups of excitation light sources with different wavelengths and the wavelength characteristic is flattened by eliminating the intensity deviation of signal light or a characteristic is obtained that has a specific inclination.

In accordance with the first aspect of the present invention that attains the above-described object, there is provided a Raman amplifier that amplifies a signal light intensity by using a Raman amplification effect of an optical fiber transmission channel, the Raman amplifier having:

an excitation unit that supplies excitation lights of a plurality of wavelengths to an optical fiber transmission channel and performs Raman amplification;

a signal light monitor that monitors an intensity of a signal light of each wavelength contained in an input signal light;

an output light intensity deviation monitoring circuit that finds a deviation in the intensity of each signal light detected by the signal light monitor; and an excitation light control circuit that controls an excitation light intensity from excitation light sources of each wavelength constituting the excitation unit so as to correspond to a predetermined characteristic, based on the deviation of the intensity of signal light found by the output light intensity deviation monitoring circuit, wherein the excitation light control circuit has a storage unit that storages a sum total quantity of excitation light intensities of wavelengths to be multiplexed before implementing control of excitation light intensity corresponding to the predetermined characteristic, and the excitation light control circuit controls the excitation light intensity from excitation light sources of each wavelength by distributing the sum total quantity of excitation light intensities stored in the storage unit according to a deviation ratio of intensities of signal lights found in the output light intensity deviation monitoring circuit.

In accordance with the second aspect of the present invention that attains the above-described object, there is provided a Raman amplifier that amplifies a signal light intensity by using a Raman amplification effect of an optical fiber transmission channel, the Raman amplifier having:

a Raman amplification unit having an excitation unit that supplies excitation lights of a plurality of wavelengths to an optical fiber transmission channel and performs Raman amplification, and an excitation light control circuit that controls a light emission intensity of the excitation light with respect to the excitation light unit;

a signal light monitor that monitors an intensity of a signal light of each wavelength contained in a signal light that is Raman amplified; and an output light intensity deviation monitoring circuit that finds a deviation in the intensity of each signal light detected by the signal light monitor, wherein the excitation light control circuit of the Raman amplification unit has a storage unit that storages a sum total quantity of excitation light intensities of wavelengths to be multiplexed before implementing control of excitation light intensity corresponding to the predetermined characteristic, and the excitation light control circuit controls the excitation light intensity from excitation light sources of each wavelength by distributing the sum total quantity of excitation light intensities stored in the storage unit according to a deviation ratio of intensities of signal lights found in the output light intensity deviation monitoring circuit.

Further, in accordance with the third aspect of the present invention that attains the above-described object, there is provided a Raman amplifier that amplifies a signal light intensity by using a Raman amplification effect of an optical fiber transmission channel, the Raman amplifier having:

an excitation unit that supplies excitation lights of a plurality of wavelengths to an optical fiber transmission channel and performs Raman amplification;

a signal light monitor that monitors an intensity of a signal light of each wavelength contained in a signal light that is Raman amplified;

an output light intensity deviation monitoring circuit that finds a deviation in an intensity of each signal light detected by the signal light monitor; and an excitation light control unit that controls an excitation light intensity from excitation light sources of each wavelength constituting the excitation unit so as to correspond to a predetermined characteristic, based on the deviation of the intensity of signal light found by the output light intensity deviation monitoring circuit;

a storage device that storages a sum total quantity of excitation light intensities of wavelengths to be multiplexed before implementing control of excitation light intensity corresponding to the predetermined characteristic;

a variable optical attenuator disposed between the excitation unit and the optical fiber transmission channel; and an optical attenuation quantity control circuit that controls an attenuation quantity of the variable optical attenuator so as to limit the excitation light intensity supplied from the excitation unit to the optical fiber transmission channel to the sum total quantity of excitation light intensities stored in the storage device.

In accordance with the fourth aspect of the present invention that attains the above-described object, there is provided a Raman amplifier that amplifies a signal light intensity by using a Raman amplification effect of an optical fiber transmission channel, the Raman amplifier having:

a Raman amplification unit having an excitation unit that supplies excitation lights of a plurality of wavelengths to an optical fiber transmission channel and performs Raman amplification and an excitation light control circuit that controls a light emission intensity of the excitation light with respect to the excitation light unit;

another optical amplifier connected to a downstream side of the Raman amplification section in the signal light transmission direction, a signal light monitor that monitors an intensity of a signal light of each wavelength contained in a signal light that is optically amplified by both the Raman amplification unit and the other optical amplifier; and an output light intensity deviation monitoring circuit that finds a deviation in the intensity of each signal light detected by the signal light monitor, wherein the excitation light control circuit of the Raman amplification unit has a storage unit that storages a sum total quantity of excitation light intensities of wavelengths to be multiplexed before implementing the control of excitation light intensity corresponding to the predetermined characteristic, and the excitation light control circuit controls the excitation light intensity from excitation light sources of each wavelength by distributing the sum total quantity of excitation light intensities stored in the storage unit according to a deviation ratio of intensities of signal lights found in the output light intensity deviation monitoring circuit.

In accordance with the fifth aspect of the present invention that attains the above-described object, there is provided an optical communication system having an optical fiber transmission channel and a plurality of Raman amplifiers disposed in the optical fiber transmission channel, wherein each of the plurality of Raman amplifiers has:

an excitation unit that supplies excitation lights of a plurality of wavelengths to the optical fiber transmission channel and performs Raman amplification;

a signal light monitor that monitors an intensity of a signal light of each wavelength contained in a signal light subjected to Raman amplification;

an output light intensity deviation monitoring circuit that finds a deviation in the intensity of each signal light detected by the signal light monitor; and an excitation light control circuit that controls an excitation light intensity from excitation light sources of each wavelength constituting the excitation unit so as to correspond to a predetermined characteristic, based on the deviation of the intensity of signal light found by the output light intensity deviation monitoring circuit, wherein the excitation light control circuit has a storage unit that storages a sum total quantity of excitation light intensities of wavelengths to be multiplexed before implementing the control of excitation light intensity correspondingly to the predetermined characteristic, and the excitation light control circuit controls the excitation light intensity from excitation light sources of each wavelength by distributing the sum total quantity of excitation light intensities stored in the storage unit according to a deviation ratio of intensities of signal lights found in the output light intensity deviation monitoring circuit.

In accordance with the sixth aspect of the present invention that attains the above-described object, there is provided a method for controlling excitation light intensity in a Raman amplifier that amplifies a signal light intensity by using a Raman amplification effect of an optical fiber transmission channel, having the steps of:

storing in advance a sum total of excitation light intensities of each of a plurality of wavelengths to be multiplexed in a storage unit;

detecting a signal light intensity of each wavelength contained in a signal light that is Raman amplified;

finding a deviation in the intensity of each detected signal light;

controlling an excitation light intensity from an excitation light source of each wavelength constituting an excitation unit so as to correspond to the predetermined characteristic, based on the found deviation of the intensity of signal light, wherein in the step of controlling an excitation light intensity, the excitation light intensity from excitation light sources of each wavelength is controlled by distributing the sum total quantity of excitation light intensities stored in the storage unit according to a deviation ratio of found intensities of signal lights.

By using the Raman amplifier having specific features of the present invention, it is possible to control the intensity deviation of signal light to a wavelength characteristic that is flat and has a predetermined inclination and also to maintain a constant Raman gain of signal light and realize good transmission characteristic, so that the sum total quantity of excitation light power after the gain deviation control is not increased or decreased with respect to that before the gain deviation control.

BRIEF DESCRIPTION OF THE DRAWINGS

FIG. 5 illustrates schematically the gain deviation control;

FIG. 7 is an explanatory drawing illustrating an example of conventional gain deviation control;

DESCRIPTION OF THE PREFERRED EMBODIMENTS

An embodiment of the present invention will be described below with reference to the appended drawings.

Figure 9:
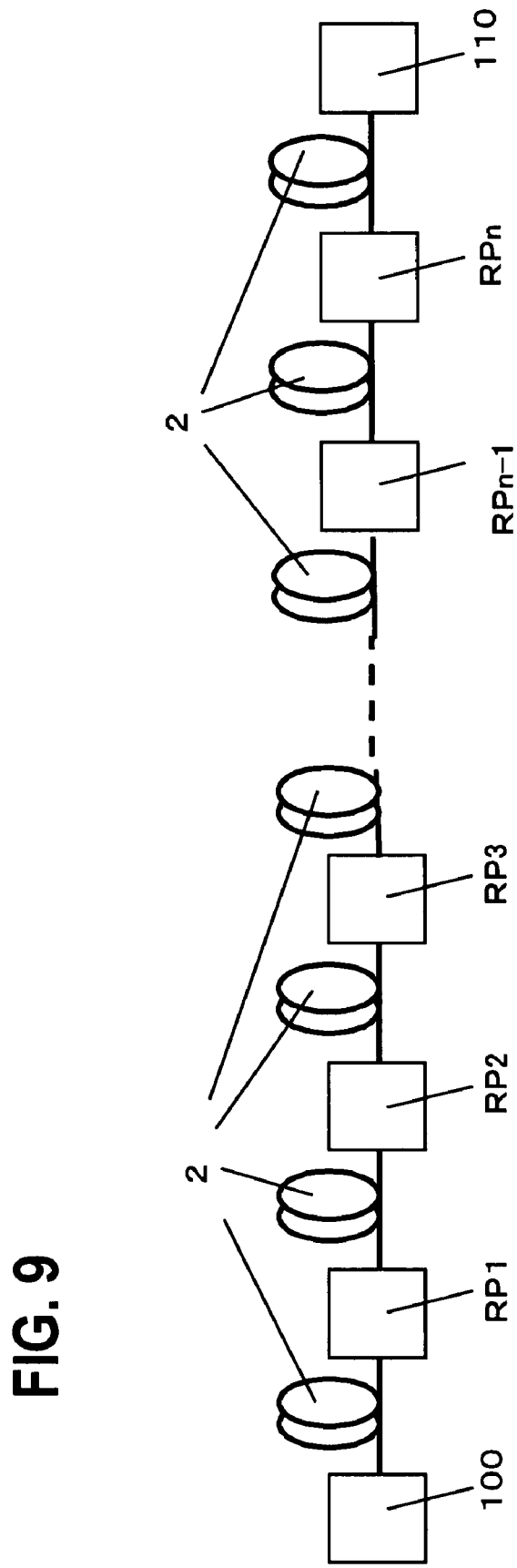
FIG. 9 illustrates a configuration example of an optical transmission system composed of a transmission end station, a reception end station, and a plurality of relay stations as an optical communication device that uses the Raman amplifier in accordance with the present invention.

FIG. 9 is an example of an optical transmission system in which a plurality of Raman amplifiers employing the present invention are connected sequentially.

FIG. 9 illustrates a WDM (Wavelength Division Multiplexing) transmission system in which information is transmitted between a transmission end station 100 and a reception end station 110 by wavelength division multiplexed optical signals. A plurality of relay stations R1-Rn are disposed on the optical fiber transmission channel 2 connecting the transmission end station 100 and reception end station 110.

Here, a pre-amplifier that performs amplification in advance to a high-intensity signal light and transmits the amplified signal light to the optical fiber transmission channel 2 may be installed in the transmission end station 100 with the object of compensating optical loss in the optical fiber transmission channel 2. A pre-amplifier that amplifies and transmits to a receiver the signal light that became very weak due to optical loss in the optical fiber transmission channel 2 after being outputted from the relay station Rn may be installed in the reception end station 110.

An amplifier comprising an optical fiber doped with a rare earth metal, or a Raman amplifier, or both amplifiers can be installed in the relay stations R1-Rn as optical amplifiers for amplifying a signal light that underwent optical loss in the upstream optical fiber transmission channel 2 and transmitting the amplified signal light to the downstream transmission channel.

First Embodiment

The present invention relates to a specific configuration of fiber Raman amplifier (FRA) that is provided in each relay station in the optical transmission system such as shown in FIG. 9. A configuration that is a first embodiment of such an amplifier is shown in FIG. 10.

Figure 10:
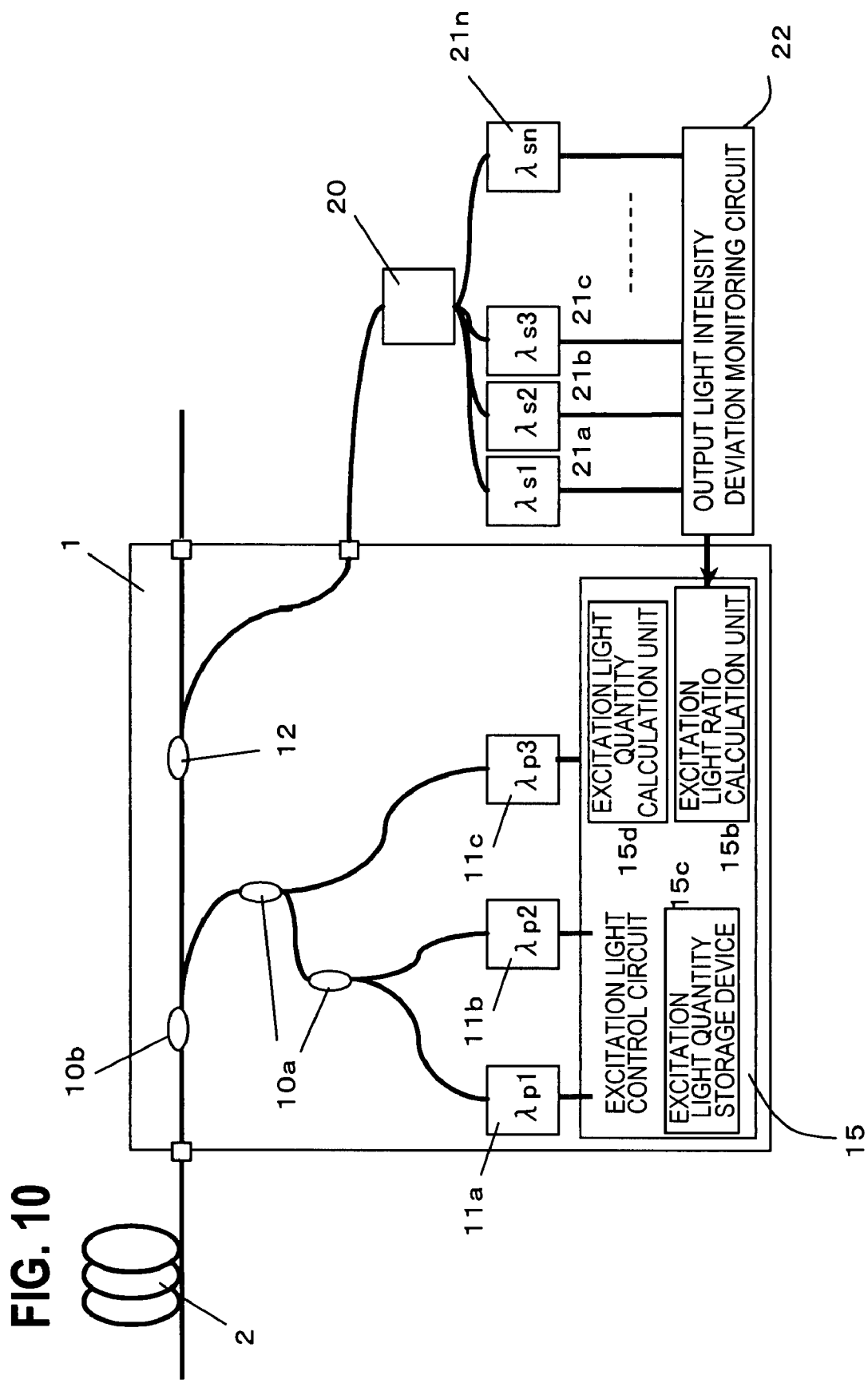
FIG. 10 illustrates a configuration example of the Raman amplifier of the first embodiment.

The Raman amplifier shown in FIG. 10 comprises a group of excitation light sources that has a plurality of excitation light sources 11a, 11b, 11c that differ in a wavelength, multiplexing units 10a, 10b, a branching unit 12, and an excitation light control circuit 15 in a Raman amplification unit 1. Further, an optical signal branching unit 20 such as an optical branching unit of an array waveguide grating type is provided at the output side of the Raman amplification unit 1.

The optical signal branching unit 20 branches optical signals according to the wavelength thereof. The branched optical signals of different wavelengths are inputted to corresponding signal light monitors 21a, 21b, ... 21n.

Detection level signals for each wavelength detected by the signal light monitors 21a, 21b, ... 21n are inputted to an output light intensity deviation monitoring circuit 22.

The output of the output light intensity deviation monitoring circuit 22 is inputted to an excitation light ratio calculation unit 15b of the excitation light control circuit 15.

Here, each excitation light source 11a, 11b, 11c of the group of excitation light sources is configured from a light source generating light of a specific wavelength, for example, a laser diode.

An excitation light source with a wavelength corresponding to a signal light wavelength may be configured by using the fact that the quartz glass used for the optical fiber has a maximum amplification characteristic in a frequency region of less than about 13.2 THz with respect to the excitation light wavelength.

In a WDM transmission system in which signal light in a wide wavelength region is amplified in a batch mode, a plurality of light sources with respectively different wavelengths are provided. In the configuration example of the present embodiment, the group of excitation light sources outputs three excitation lights. Thus, the excitation light sources 11a, 11b, and 11c output the excitation lights $\lambda_{P1}$, $\lambda_{P2}$, and $\lambda_{P3}$, respectively.

For example, the excitation lights n (n=1-3) $\lambda_{Pn}$ may be configured of a plurality of excitation light groups of similar wavelengths with a small difference between the wavelengths. In the configuration of the present embodiment, three groups are considered, but the number of groups may be four or more.

The multiplexing unit 10a is a unit for gathering the three excitation lights with wavelengths $\lambda_{P1}$, $\lambda_{P2}$, $\lambda_{P3}$ that are generated by the excitation-light source group in one optical fiber. For example, an optical coupler that performs multiplexing to one fiber at a 1:1 ratio, or a polarization coupler that multiplexes lights with different polarization directions at 90° can be used.

The multiplexing unit 10b is a unit that incident the excitation light into the optical fiber transmission path 2 where the signal light will be amplified. For example, an optical coupler equipped with a wavelength filter that transmits wavelengths of the excitation light source group and prevents the signal light that is opposite to the excitation light incident in the direction of the excitation light source group can be used as such a multiplexing unit.

The signal light monitors 21a, 21b, ... 21n have a function of detecting the intensities of signal lights that are branched correspondingly to the wavelength of the signal light in the signal light branching unit 20 after part of the signal light that passed through the optical fiber transmission channel 2 has been branched in the branching unit 12.

An optical branching device that performs branching to one fiber at a branching ratio of, for example, 1:10 is used as the branching unit 12 of signal light. An optical branching unit, for example, an optical branching unit of an array waveguide grating type can be used as the signal light branching unit 20 that branches signal light according to the wavelength.

In the configuration example of the present invention, the signal light is branched into n components: $\lambda_{SIG1}$, $\lambda_{SIG2}$, ..., $\lambda_{SIGn}$ according to the wavelength.

Light receiving elements performing photoelectric conversion, such as photodiodes, are used as the signal light monitors 21a, 21b, ... 21n, and each of n components $\lambda_{SIG1}$, $\lambda_{SIG2}$, ..., $\lambda_{SIGn}$ branched by the signal light branching means 20 is inputted into the corresponding signal light monitor 21a, 21b, ..., 21n.

The output light intensity deviation monitoring circuit 22 has an average value detection unit that finds an average value of the signal light intensity based on each signal light intensity detected with the signal light monitors 21a, 21b, ... 21n, and calculates the deviation quantity of signal light intensity for each signal light intensity by taking the difference with the average value of the signal light intensity found with the average value detection unit as "deviation".

The excitation light control circuit 15 comprises an excitation light quantity storage device 15c that stores the sum total quantity of excitation light power before the implementation of the gain deviation control and an excitation light ratio calculation unit 15b that performs control to the desired deviation quantity of output light intensity based on the deviation quantity of output light intensity calculated with the output light intensity deviation monitoring unit 22.

The excitation light quantity storage unit 15c comprises a storage medium such as a memory that stores the sum total quantity of excitation light power before the implementation of the gain deviation control. The excitation light ratio calculation unit 15b calculates the power ratio of excitation light wavelengths for which the intensity deviation of signal light becomes a predetermined property. The excitation light control circuit 15 has a function of distributing the excitation light ratio calculated by the excitation light ratio calculation unit 15b with respect to the sum total quantity of excitation light power stored in the excitation light quantity storage unit 15c and setting the power quantity of each excitation light wavelength.

Because the sum total quantity can be equivalently found from the excitation light intensity of each wavelength, the excitation light intensity of each wavelength may be stored instead of storing the sum total quantity of excitation light power before the implementation of the gain deviation control in the excitation light quantity storage unit 15c.

With the gain deviation control of the first embodiment, the sum total quantity of excitation light power that was held before the gain deviation control is distributed at a ratio of excitation light power of each wavelength, and the intensity deviation of signal light after Raman amplification can be set to the predetermined characteristic and the Raman gain of the signal light can be held at a constant level, without decreasing or increasing the sum total of the excitation light power after the gain deviation control with respect to that before the gain deviation control.

A processing sequence relating to the case of flattening the wavelength characteristic of signal light intensity in the configuration of the first embodiment will be explained with the flowchart shown in FIG. 11.

Step 1-S1: a sum total quantity Ptotal_a of excitation light power that will be inputted to the optical fiber transmission channel 2 is held in the excitation light quantity storage device 15c that is a storage medium such as a memory before the implementation of the gain deviation control.

The excitation light power incident from the excitation light sources 11a, 11b, 11c into an amplification medium such as an optical fiber transmission channel before the implementation of the gain deviation control is denoted by Pp1_a, Pp2_a, Pp3_a, respectively.

Here, the sum total quantity Pp_total_a of excitation light power incident from the excitation light source group into the amplification medium before the implementation of the gain deviation control is represented by Formula (1).

$$Pp\_total\_a = Pp1\_a + Pp2\_a + Pp3\_a \tag{1}$$

For example, if the power Pp1 of the excitation light 1 is taken as 150 mW, the power Pp2 of the excitation light 2 is taken as 150 mW, and the power Pp3 of the excitation light 3 is taken as 150 mW, then the sum total power Pp_total_a 1=450 mW of excitation lights will be held in the excitation light quantity storage device 15c.

Step 1-S2; a deviation quantity of signal light intensity before the gain deviation control is found in the output light intensity deviation monitoring circuit 22.

The signal light intensity of wavelengths $\lambda_{SIG1}, \lambda_{SIG2}, \ldots, \lambda_{SIGn}$ that were detected by signal light monitors 21a, 21b, ... 21n, respectively, are denoted by Psig1_a, Psig2_a, ..., Psign_a.

Figure 1:
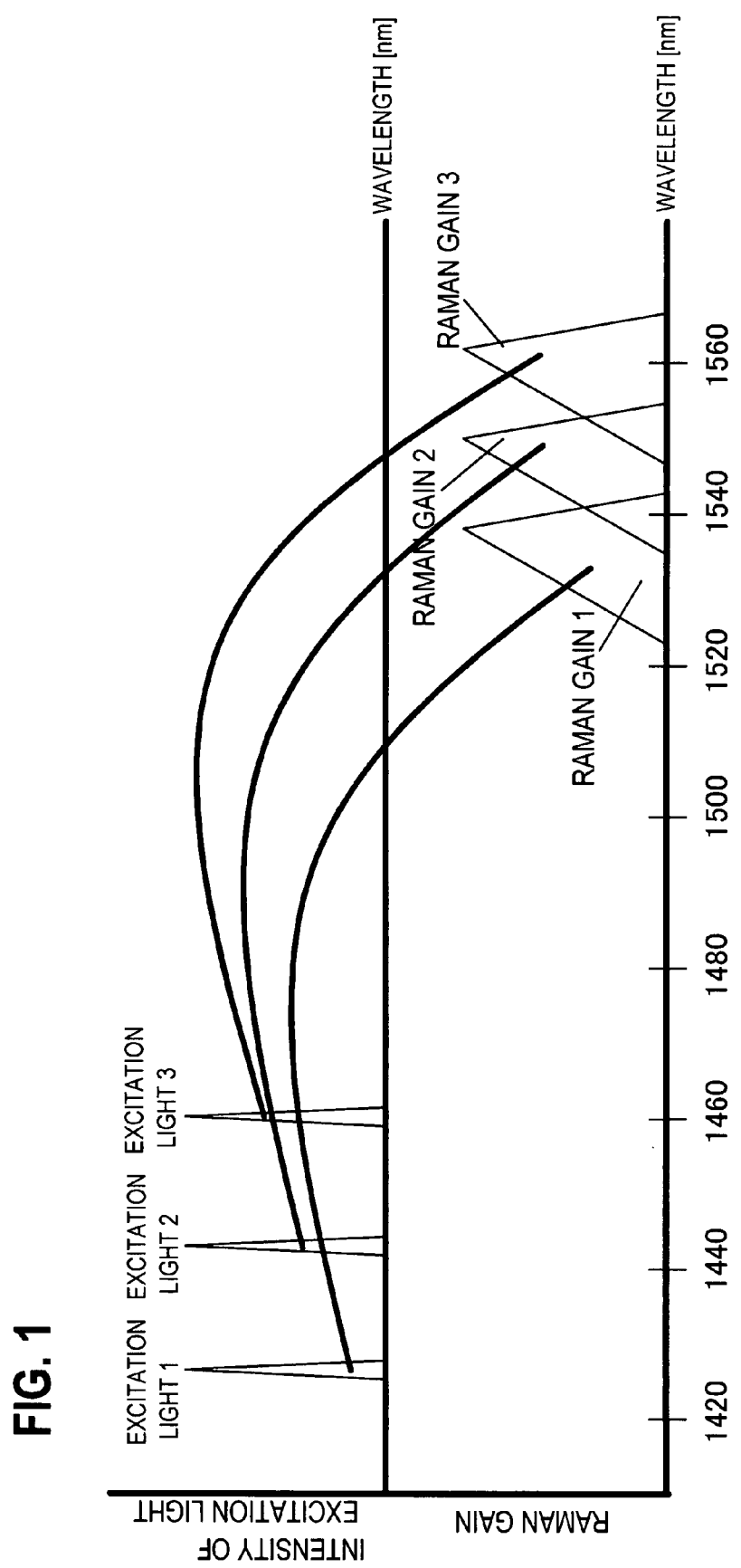
FIG. 1 is an explanatory drawing of a Raman amplification characteristic.
Figure 2:
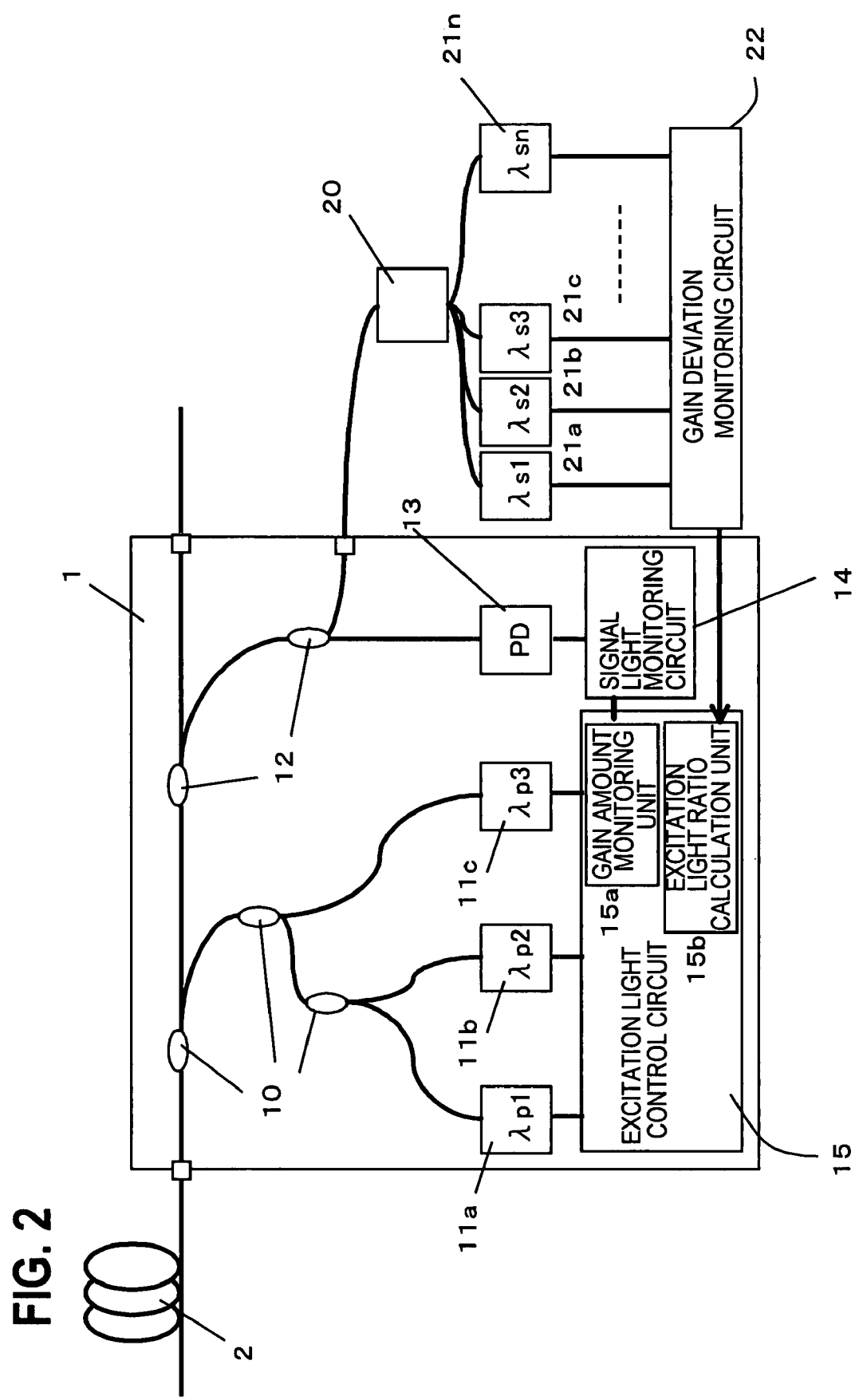
FIG. 2 is a drawing explaining an example of configuration of the conventional Raman amplifier.
Figure 3:
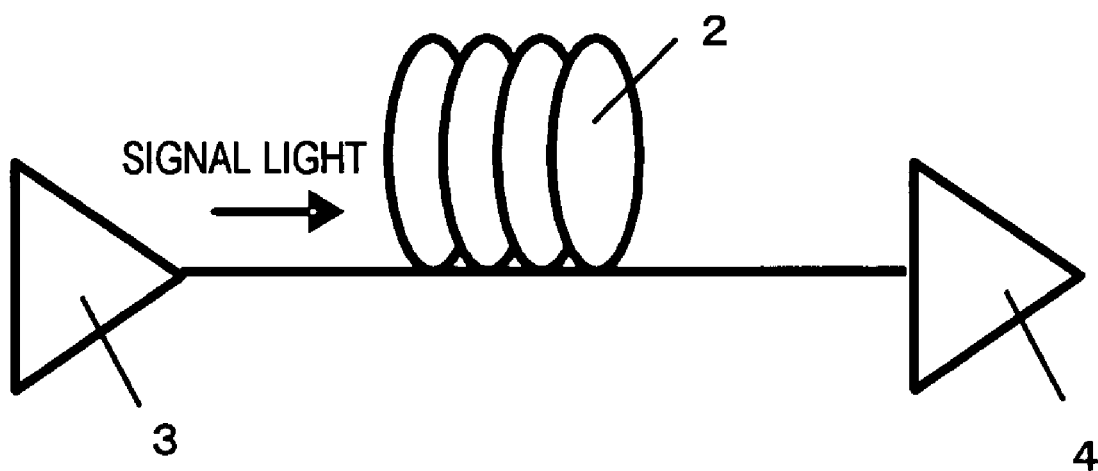
FIG. 3 is a structural drawing illustrating an example of an optical fiber to which the Raman amplifier is connected and transmission-reception optical amplifiers sandwiching the optical fiber.
Figure 4A:
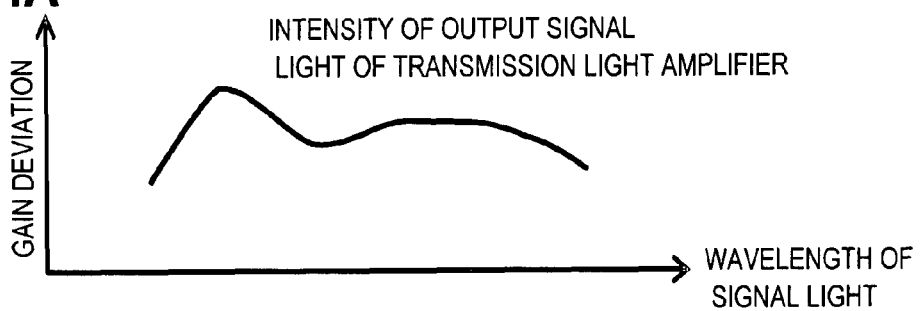
FIG. 4 shows the gain deviation of the transmission optical amplifier and reception optical amplifier shown in FIG. 3, a wavelength characteristic of optical loss in the optical fiber, and a wavelength characteristic of signal light intensity after the reception optical amplifier.
Figure 4B:
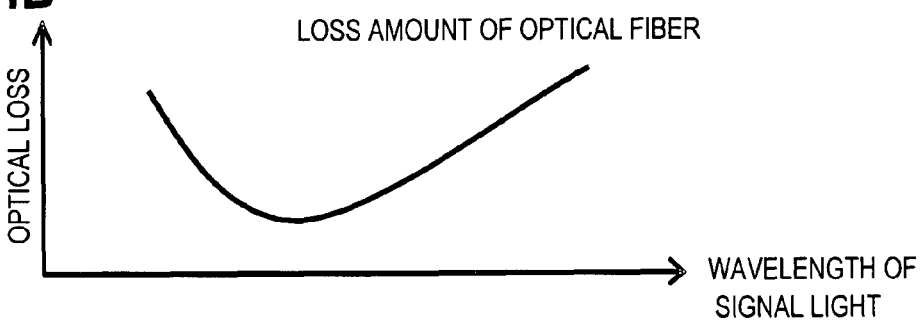
Figure 4C:
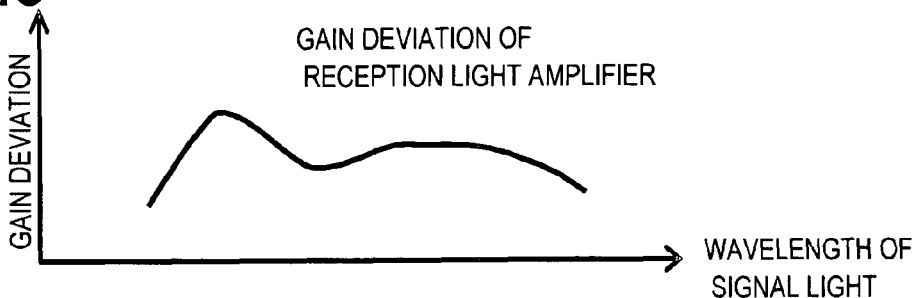
Figure 4D:
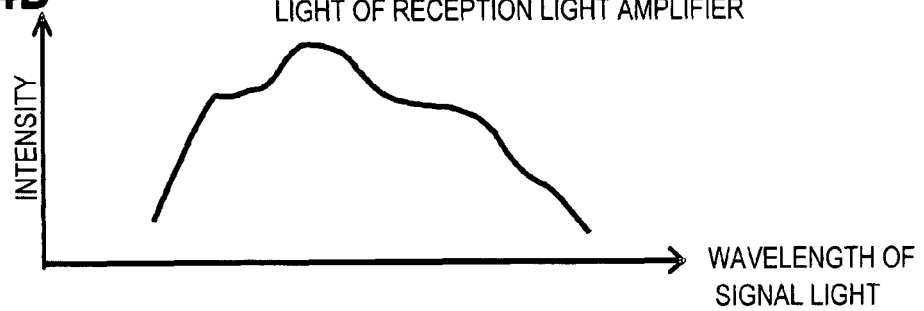
Figure 6A:
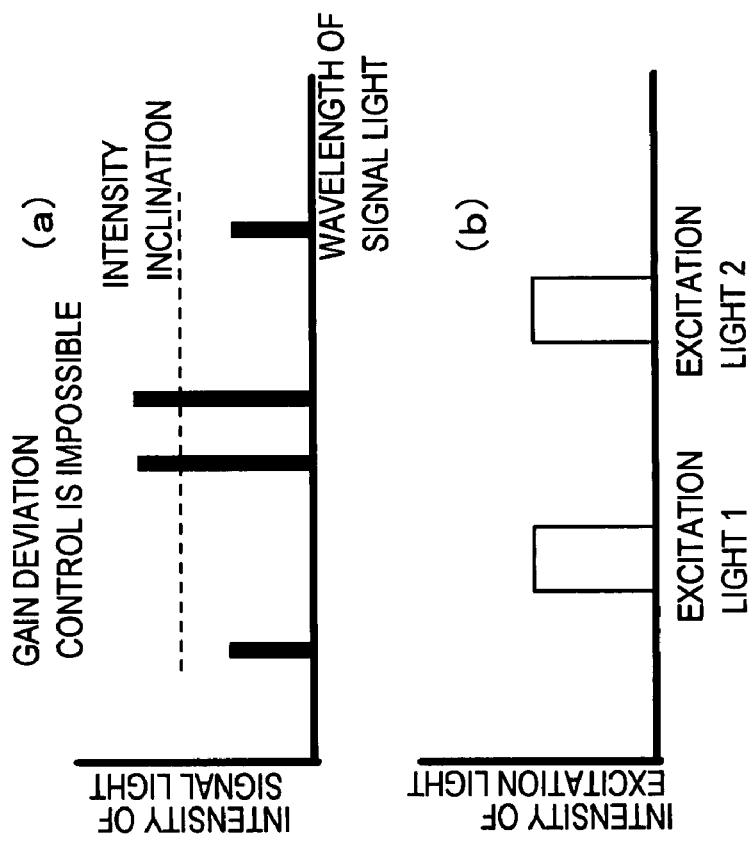
FIG. 6 is an explanatory drawing illustrating an example of conventional gain deviation control.
Figure 6B:
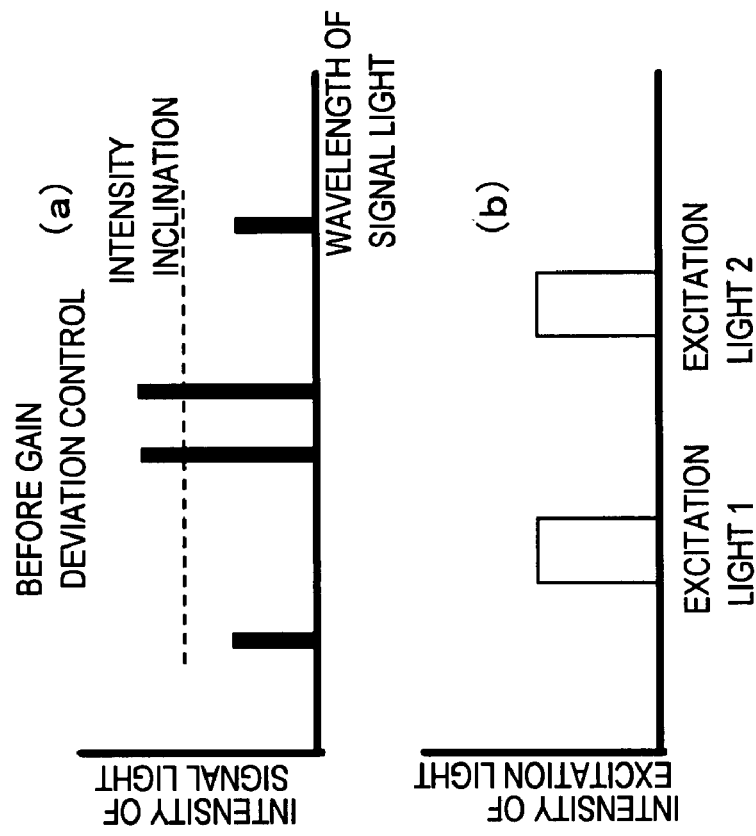

As shown in FIG. 1, characteristics of Raman amplification bands of the excitation light 1, excitation light 2, and excitation light 3 are determined according to the amplification medium such as an optical fiber transmission channel. An example of grouping the signal lights $\lambda_{SIG1}, \lambda_{SIG2}, \ldots, \lambda_{SIGn}$ into three blocks according to the Raman amplification bands of the excitation light 1, excitation light 2, and excitation light 3 is shown in Table 1.

TABLE 1

| Signal group | Signal channel | Signal light intensity (dBm) | Average for all signals | Average for each block | Intensity deviation |
|---|---|---|---|---|---|
| First block | 1 | x | Psig_avg_a = −16.0 dBm | Psig_avg1_a = −16.4 dBm | ΔPsig_BL1 = −0.4 dB |
|  | 2 | x |  |  |  |
|  | 3 | −16.2 |  |  |  |
|  | 4 | x |  |  |  |
|  | 5 | −16.4 |  |  |  |
|  | 6 | x |  |  |  |
|  | 7 | x |  |  |  |
|  | 8 | −16.5 |  |  |  |
|  | 9 | x |  |  |  |
|  | 10 | x |  |  |  |
|  | 11 | −16.4 |  |  |  |
|  | 12 | x |  |  |  |
|  | 13 | x |  |  |  |
| Second block | 14 | x |  | Psig_avg2_a = −15 dBm | ΔPsig_BL2 = +1.0 dB |
|  | 15 | x |  |  |  |
|  | 16 | x |  |  |  |
|  | 17 | −15.1 |  |  |  |
|  | 18 | x |  |  |  |
|  | 19 | x |  |  |  |
|  | 20 | x |  |  |  |
|  | 21 | x |  |  |  |
|  | 22 | x |  |  |  |
|  | 23 | −14.9 |  |  |  |
|  | 24 | x |  |  |  |
|  | 25 | −14.9 |  |  |  |
|  | 26 | x |  |  |  |
|  | 27 | x |  |  |  |
| Third block | 28 | x |  | Psig_avg3_a = −16.6 dBm | ΔPsig_BL3 = −0.6 dB |
|  | 29 | −16.4 |  |  |  |
|  | 30 | x |  |  |  |
|  | 31 | x |  |  |  |
|  | 32 | −16.7 |  |  |  |
|  | 33 | x |  |  |  |
|  | 34 | x |  |  |  |
|  | 35 | x |  |  |  |
|  | 36 | −16.4 |  |  |  |

TABLE 1-continued

| Signal group | Signal channel | Signal light intensity (dBm) | Average for all signals | Average for each block | Intensity deviation |
|---|---|---|---|---|---|
| | 37 | x | | | |
| | 38 | x | | | |
| | 39 | −16.8 | | | |
| | 40 | x | | | |

Table 1 illustrates an example in which of the signal light channels corresponding to the wavelength, channels 1 to 13 are allocated to the first block, channels 14 to 27 are allocated to the second block, and channels 28 to 40 are allocated to the third block.

When the number of wavelengths operating in the transmission system during the implementation of the gain deviation control is $\lambda_{total}$, the average intensity Psig_avg_a of signal light is represented by formula (2).

$$\text{Psig\_avg\_a} = \frac{\sum_n \text{Psig\_n}}{\lambda_{total}} \tag{2}$$

Here, $\Sigma \text{Psig\_n}$ is a value obtained by adding up the intensities of signal lights used in the operation of the transmission system. For example, when signal light channels operate as shown in Table 1, the calculation yields the total number of wavelengths $\lambda_{total}=11$ and the average intensity of signal light Psig_avg_a=−16.0 dBm.

Then, an intensity deviation of signal light of each block obtained by grouping into three blocks is calculated. When the number of wavelengths operating in the first block is $\lambda_{BL1}$, the average intensity Psig_avg1_a of signal light of the first block is represented by Formula (3).

$$\text{Psig\_avg1\_a} = \frac{\sum_{BL1} \text{Psig\_n}}{\lambda_{BL1}} \tag{3}$$

Here, $\Sigma \text{Psig\_n}$ is a value obtained by adding up the intensities of signal lights used in the operation of the transmission system in the first block. In the case shown in Table 1, the calculation yields the number of wavelengths operating in the first block $\lambda_{BL1}=4$ and the average intensity of signal light Psig_avg1_a=−16.4 dBm.

Likewise, the average intensity Psig_avg2_a of signal light at the number of wavelengths $\lambda_{BL2}$ operating in the second block and the average intensity Psig_avg3_a of signal light at the number of wavelengths $\lambda_{BL3}$ operating in the third block are represented by formulas (4) and (5), respectively.

$$\text{Psig\_avg2\_a} = \frac{\sum_{BL2} \text{Psig\_n}}{\lambda_{BL2}} \tag{4}$$

$$\text{Psig\_avg3\_a} = \frac{\sum_{BL3} \text{Psig\_n}}{\lambda_{BL3}} \tag{5}$$

In the case shown in Table 1, the calculation yields the number of wavelengths operating in the second block $\lambda_{BL2}=3$, the average intensity of signal light in the second block Psig_avg2_a=−15.0 dBm, the number of wavelengths operating in the third block $\lambda_{BL3}=4$, the average intensity of signal light in the third block Psig_avg3_a=−16.6 dBm.

The intensity deviation $\Delta$Psig_BL1, $\Delta$Psig_BL2, $\Delta$Psig_BL3 of signal light of each block is represented by the following formulas (6), (7), (8), respectively, via the average intensity Psig_avg_a of the signal light and average intensity Psig_avg1_a, Psig_avg2_a, Psig_avg3_a of signal light of each block.

$$\Delta \text{Psig\_BL1} = \text{Psig\_avg1\_a} - \text{Psig\_avg\_a} \tag{6}$$

$$\Delta \text{Psig\_BL2} = \text{Psig\_avg2\_a} - \text{Psig\_avg\_a} \tag{7}$$

$$\Delta \text{Psig\_BL3} = \text{Psig\_avg3\_a} - \text{Psig\_avg\_a} \tag{8}$$

In the case shown in Table 1, the intensity deviation $\Delta$Psig_BL1, $\Delta$Psig_BL2, $\Delta$Psig_BL3 of signal light of each block is calculated as $\Delta$Psig_BL1=−0.4 dB, $\Delta$Psig_BL2=+1.0 dB, $\Delta$Psig_BL3=−0.6 dB.

Step 1-S3: the excitation light power ratio of excitation light 1, excitation light 2, excitation light 3 that flattens the wavelength characteristic of signal light intensity is calculated with the excitation light ratio calculation unit 15b.

Figure 8A:
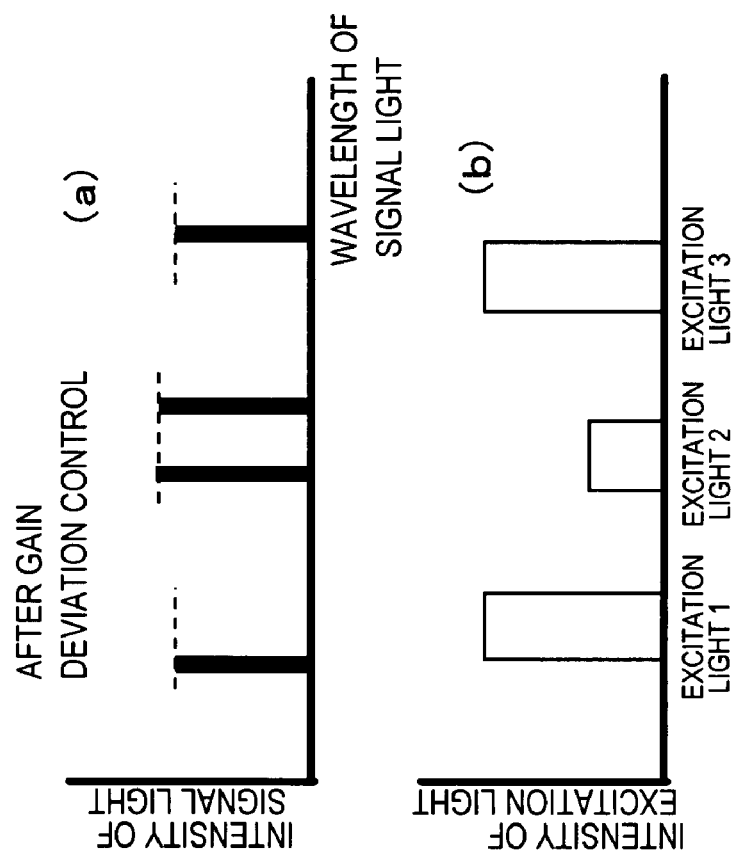
FIG. 8 is an explanatory drawing illustrating an example of conventional gain deviation control.
Figure 8B:
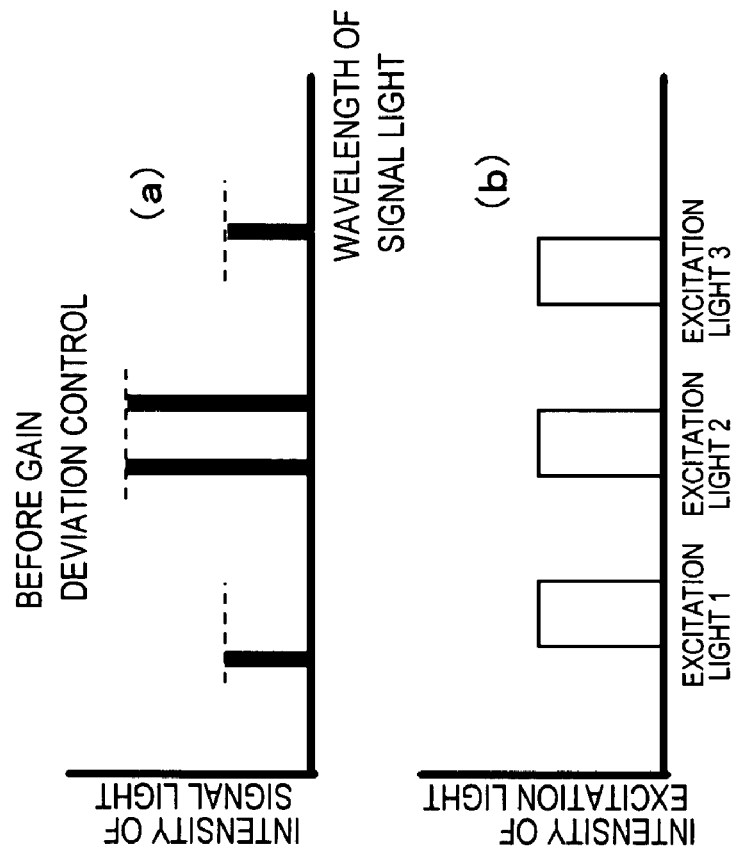

As shown in FIG. 1, the Raman amplification band is known to be a wide band with respect to an excitation light wavelength. In the description of Japanese Patent Application Laid-open No. 2002-72262, a characteristic is explained according to which if the power of excitation light 1 is changed as shown in FIG. 8A and FIG. 8, then not only the signal light intensity of the first block, but also the signal light intensity of the second and third blocks is affected. In another representation, a characteristic is explained according to which the signal light intensity of the first block is affected not only by the power of excitation light 1, but also by the power of excitation light 2 and excitation light 3.

In the invention described in Japanese Patent Application Laid-open No. 2002-72262, with consideration for the above-described characteristic, the relationship between the variation quantity $\Delta$Psig_BL1 of signal intensity of the first block and the power variation quantities $\Delta$Pp1, $\Delta$Pp2, $\Delta$Pp3 of the excitation light 1, excitation light 2, excitation light 3 is represented by formula (9), where the gain variation coefficient representing the effect of the power of excitation light 1 on the variation of signal light intensity of the first block is denoted by A11, and the gain variation coefficients of the excitation light 2 and excitation light 3 are similarly denoted by A12, A13.

$$\Delta \text{Psig\_BL1} = A11 \times \Delta Pp1 + A12 \times \Delta Pp2 + A13 \times \Delta Pp3 \tag{9}$$

Likewise, the variation quantity $\Delta$Psig_BL2 of signal intensity of the second block and the variation quantity $\Delta$Psig_BL3 of signal intensity of the third block are represented by formulas (10) and (11).

$$\Delta \text{Psig\_BL2} = A21 \times \Delta Pp1 + A22 \times \Delta Pp2 + A23 \times \Delta Pp3 \tag{10}$$

$$\Delta \text{Psig\_BL3} = A31 \times \Delta Pp1 + A32 \times \Delta Pp2 + A33 \times \Delta Pp3 \tag{11}$$

Here, the gain variation coefficient Amn (m, n=1, 2, 3) represents the gain variation coefficient of the effect produced by the power of excitation light n on the signal light intensity variation of the m-th block.

By combining formulas (9), (10), (11), the matrix equation represented by formula (12) can be obtained.

$$\begin{bmatrix} \Delta Psig\_BL1 \\ \Delta Psig\_BL2 \\ \Delta Psig\_BL3 \end{bmatrix} = \begin{bmatrix} A11 & A12 & A13 \\ A21 & A22 & A23 \\ A31 & A32 & A33 \end{bmatrix} \begin{bmatrix} \Delta Pp1 \\ \Delta Pp2 \\ \Delta Pp3 \end{bmatrix} \quad (12)$$

By using the inverted matrix $[Amn]^{-1}$ of the matrix $[Amn]$ represented by formula (12), the power variation quantities $\Delta Pp1$, $\Delta Pp2$, $\Delta Pp3$ of the excitation light 1, excitation light 2, excitation light 3 that flatten the wavelength characteristic of signal light intensity can be found by formula (13).

$$\begin{bmatrix} \Delta Pp1 \\ \Delta Pp2 \\ \Delta Pp3 \end{bmatrix} = \begin{bmatrix} A11 & A12 & A13 \\ A21 & A22 & A23 \\ A31 & A32 & A33 \end{bmatrix}^{-1} \begin{bmatrix} \Delta Psig\_BL1 \\ \Delta Psig\_BL2 \\ \Delta Psig\_BL3 \end{bmatrix} \quad (13)$$

The power Pp1_b, Pp2_b, Pp3_b of excitation light 1, excitation light 2, excitation light 3 after the gain deviation control is calculated by increasing or decreasing the power variation quantities $\Delta Pp1$, $\Delta Pp2$, $\Delta Pp3$ found with formula (13) to the excitation light power Pp1_a, Pp2_a, Pp3_a before the gain deviation control.

As an example, in the case where the state before the gain deviation control in a Raman amplifier using a dispersed shift fiber (DSF) is Pp1_a=150 mW, Pp2_a=150 mW, Pp3_a=150 mW $\Delta P$sig_BL1=+0.6 dB, $\Delta P$sig_BL2=+0.2 dB, $\Delta P$sig_BL3=−0.8 dB, the signal light intensity at the short wavelength side of the signal band is high and the signal light intensity at the long wavelength side is low, the excitation light power variation quantity for flattening the wavelength characteristic is calculated as $\Delta Pp1$=−1 mW, $\Delta Pp2$=−32 mW, $\Delta Pp3$=+37 mW. In this case the power of each excitation light is set to Pp1_a=149 mW, Pp2_a=118 mW, Pp3_a=187 mW, the variation quantity of excitation light power after the gain deviation control is merely 4 mW with respect to that before the control, and the average intensity of signal light caused by gain deviation control changes only by 0.2 dB.

On the other hand, in the case where

Pp1_a=150 mW, Pp2_a=150 mW, Pp3_a=150 mW $\Delta P$sig_BL1=−0.4 dB, $\Delta P$sig_BL2=+1.0 dB, $\Delta P$sig_BL3=−0.6 dB, the signal light intensity at the short wavelength side and long wavelength side of the signal band is low and the intensity close to the center of the signal band is high, as shown in FIGS. 6A, 6B, 7A, 7B, 8A, 8B, the excitation light power variation quantity for flattening the wavelength characteristic is calculated as $\Delta Pp1$=+54 mW, $\Delta Pp2$=−89 mW, $\Delta Pp3$=+63 mW.

In this case, the power of each excitation light is set to

Pp1_b=Pp1_a+$\Delta Pp1$=204 mW

Pp2_b=Pp2_a+$\Delta Pp2$=61 mW

Pp3_b=Pp3_a+$\Delta Pp3$=213 mW and the excitation light power after the gain deviation control changes by 28 mW with respect to that before the gain deviation control. As a result, the average intensity of signal light induced by the gain deviation control also changes by 1.4 dB.

In the latter case, although the wavelength characteristic of signal light intensity is flattened, the fluctuation quantity of Raman gain is large. As a result, the desired Raman gain control is not performed and an adverse effect can be produced on a signal-noise optical characteristic.

By contrast, in the first embodiment of the present invention the excitation light power ratio calculated in the gain deviation control process is distributed with respect to the total sum quantity of excitation light power before the gain deviation control that was heretofore stored.

In the above-described example, a sum total quantity Pp_total_b of excitation light power in the gain deviation control process is calculated by formula (14) with respect to the sum total quantity Pp_total_a=450 mW of excitation light power before the gain deviation control.

$$Pp\_total\_b = Pp1\_b + Pp2\_b + Pp3\_b \quad (14)$$

From this formula, Pp_total_b=478 mW.

The power ratios Pp_ratio1, Pp_ratio2, Pp_ratio3 of excitation light 1, excitation light 2, excitation light 3 are found in the manner as follows.

Pp_ratio1=Pp1_b/Pp_total_b=204 mW/478 mW=0.427.   Excitation light 1

Pp_ratio2=Pp2_b/Pp_total_b=61 mW/478 mW=0.128.   Excitation light 2

Pp_ratio3=Pp3_b/Pp_total_b=213 mW/478 mW=0.445.   Excitation light 3

Step 1-S4: the excitation light power ratios calculated in step 1-S3 are distributed from the sum total quantity Pp_total_a of excitation light power held in step 1-S1 to excitation light 1, excitation light 2, and excitation light 3. As a result, the excitation light power Pp1_b, Pp2_b, Pp3_b inputted into the transmission channel after the gain deviation control can be found by the following formulas.

Pp1_b=Pp_total_a×Pp_ratio1=450 mW×0.427=192 mW.

Pp2_b=Pp_total_a×Pp_ratio2=450 mW×0.128=58 mW.

Pp3_b=Pp_total_a×Pp_ratio3=450 mW×0.445=− 200 mW.

Step 1-S5: The power of each excitation light calculated in step 1-S4 and inputted into the transmission channel is set for each excitation light in the excitation light control circuit 15.

By implementing the above-described control, it is possible to inhibit the increase and decrease the sum total quantity of excitation light power after the gain deviation control with respect to that before the gain deviation control, prevent the fluctuations of Raman gain, and flatten the wavelength characteristic of signal light intensity.

Figure 12:
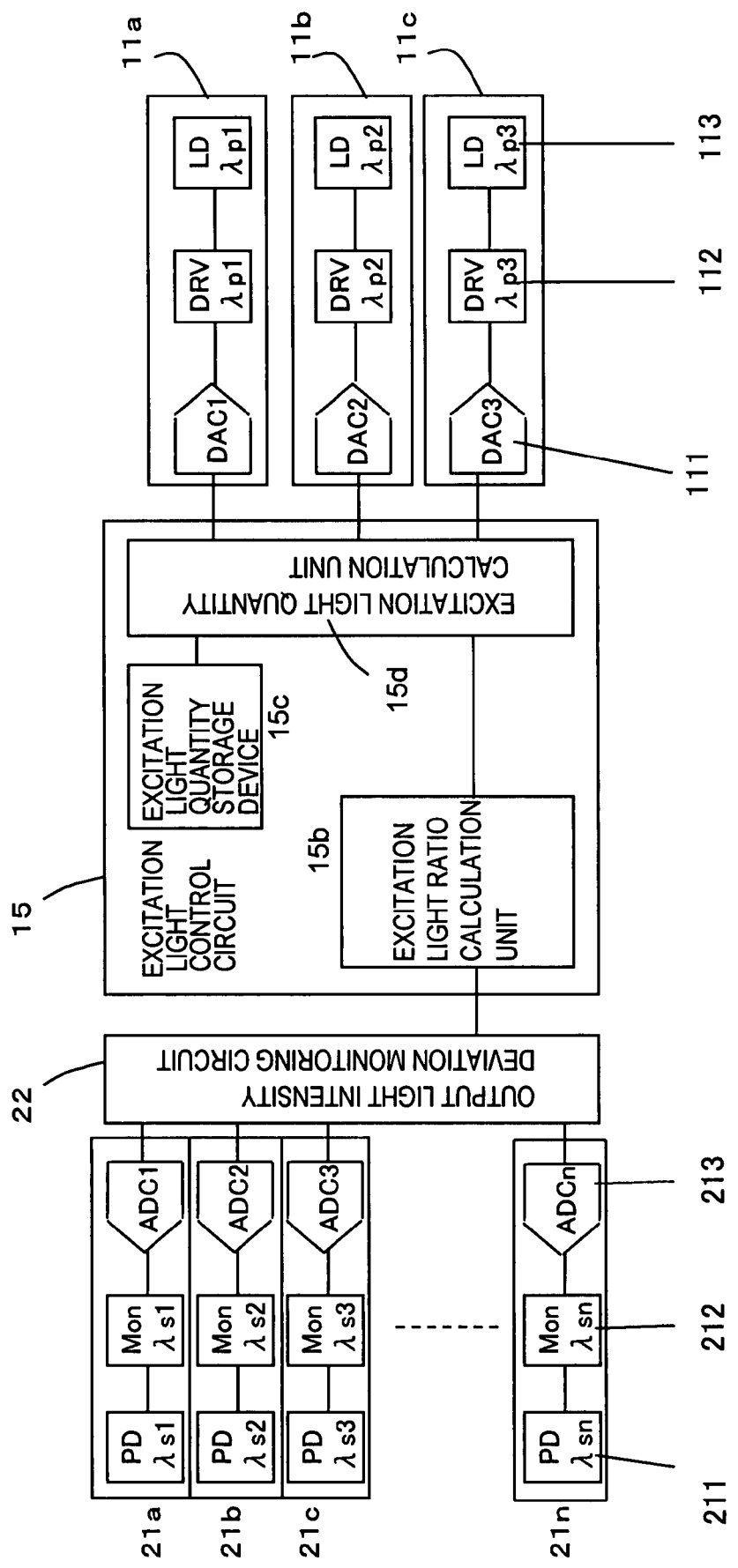
FIG. 12 shows a detailed configuration example of a signal light monitor in the optical amplifier in accordance with the present invention, an output light intensity deviation monitoring circuit, and an excitation light control circuit in the optical amplification unit.

FIG. 12 further illustrates a detailed configuration example of the signal light monitors 21a, 21b-21n and output light intensity deviation monitoring circuit 22 in the optical amplifier in accordance with the present invention that is shown in FIG. 10 and also of the excitation light control circuit 15 in the optical amplifier 1.

The signal light monitors 21a, 21b-21n comprise a light receiving element 211 (PD$\lambda_{s1}$-PD$\lambda_{sn}$), a light monitoring circuit 212 (Mon$\lambda_{s1}$-Mon$\lambda_{sn}$), and an analog-digital converter 213 (ADC1-ADCn).

The light receiving elements 211 (PDλ$_{s1}$-PDλ$_{sn}$) receive signal lights and perform the light-current conversion, and the light monitoring circuits 212 (Monλ$_{s1}$-Monλ$_{sn}$) perform the current-voltage conversion of the electric signals generated by the reception of light. The voltage corresponding to the quantity of received light that is outputted from the light monitoring circuits 212 (Monλ$_{s1}$-Monλ$_{sn}$) is inputted into the analog-digital converters 213 (ADC1-ADCn) and converted into digital signals corresponding to the light intensity of optical signals received by the light receiving element.

The output light intensity deviation monitoring circuit 22 compares the intensity of each signal light outputted from the analog-digital converters 213 (ADC1-ADCn) with the average value of signal light intensity and finds a deviation. For this purpose, an average-value detection unit is provided for finding the average value of signal intensity of each wavelength, the difference with the average value found in the average value detection unit is taken as a "deviation" for each signal light intensity, and the deviation quantity of signal light intensity is calculated.

For example, signal lights λ$_{SIG1}$, λ$_{SIG2}$, . . . , λ$_{SIGn}$ are grouped into three groups correspondingly to the Raman amplification bands of excitation light 1, excitation light 2, excitation light 3, and the intensity deviation ΔPsig_BL1, ΔPsig_BL2, ΔPsig_BL3 of signal light of each group is found from the average signal light intensity Psig_avg1_a, Psig_avg2_a, Psig_avg3_a of respective groups.

The excitation light control circuit 15 comprises the excitation light ratio computation unit 15b, excitation light quantity storage unit 15c, and excitation light quantity calculation unit 15d.

In the excitation light ratio calculation unit 15b, the intensity ratios Pp_ratio1, Pp_ratio2, Pp_ratio3 of the excitation light sources 10a (wavelength λ$_{p1}$), 10b (wavelength λ$_{p2}$), 10c (wavelength λ$_{p3}$), such that provide for the desired intensity deviation, are calculated from the signal light intensity deviation monitored by the output light intensity deviation monitoring circuit 22.

The excitation light quantity storage unit 15c holds the sum total quantity Pp_total_a of the excitation light intensity that is inputted to the transmission channel before the gain deviation control. The excitation light quantity calculation unit 15d calculates the intensities Pp1_b, Pp2_b, Pp3_b of excitation light sources 11a, 11b, 11c that will be inputted into the transmission channel after the gain deviation control, based on the sum total quantity Pp_total_a of the excitation light intensity held in the excitation light quantity storage device 15c and the intensity deviations ΔPsig_BL1, ΔPsig_BL2, ΔPsig_BL3 of signal light calculated in the excitation light ratio calculation unit 15b.

Figure 13:
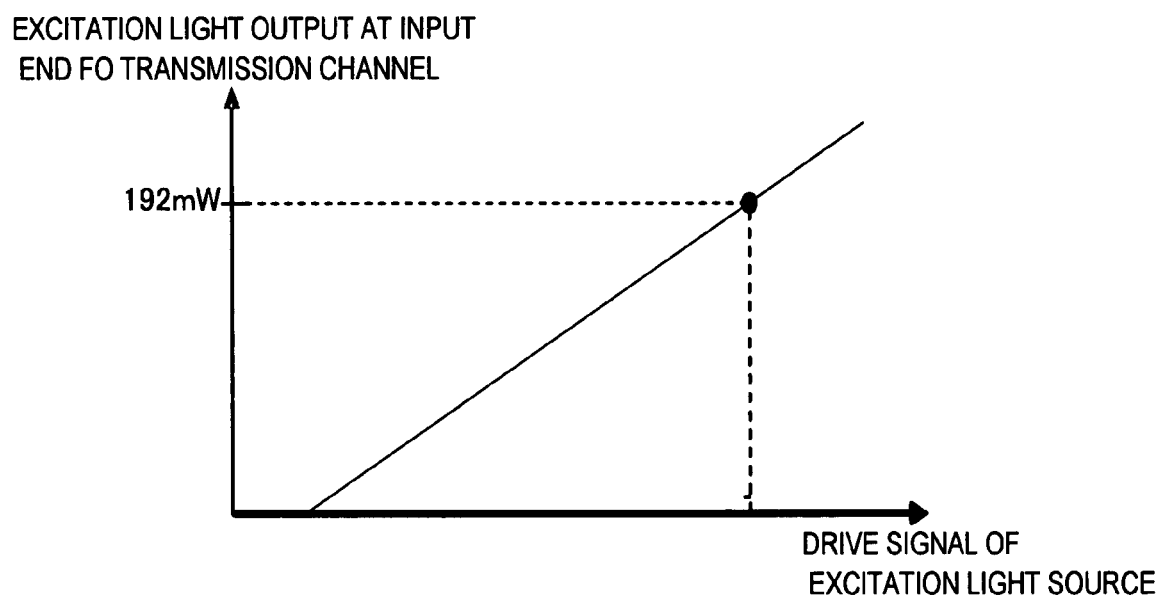
FIG. 13 is a graph showing the correspondence relationship between a drive signal of an excitation light source and an excitation light output inputted into the transmission channel.

Further, a drive signal of the excitation light source is supplied to the digital-analog converter 111 so as to obtain the excitation light intensities Pp1_b, Pp2_b, Pp3_b calculated with the excitation light quantity calculation unit 15d. The λ$_{p1}$, λ$_{p2}$, λ$_{p3}$ characteristic storage unit 15c of the excitation light control circuit 15 stores the correspondence relationships of the intensities of each excitation light λ$_{p1}$, λ$_{p2}$, λ$_{p3}$ inputted into the transmission channel and the drive signal of excitation light source. For example, a configuration can be employed such that when the correspondence relationship between the excitation light λ$_{p1}$ and the drive signal of excitation light source is such as shown in FIG. 13, and if Pp1_b=192 mW is calculated as a result of gain deviation control, then the drive signal of excitation light source corresponding to the calculated excitation light intensity is found from the correspondence relationship stored in the storage device and set to the digital-analog converter 111 (DAC1-DAC3), and the corresponding analog drive signal of excitation light source is outputted.

Figure 14:
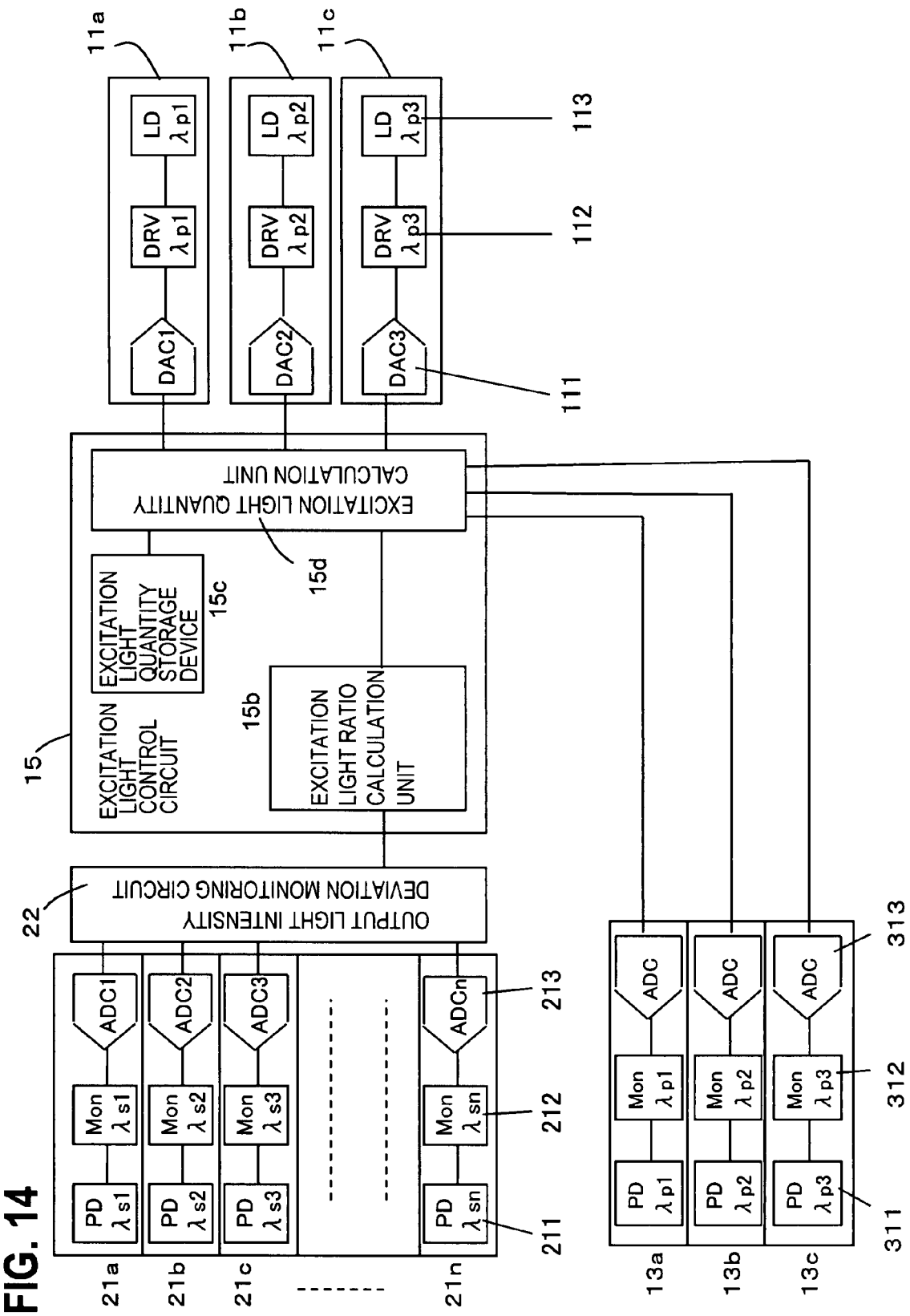
FIG. 14 illustrates a configuration example that is different from the configuration example shown in FIG. 12.

FIG. 14 shows a configuration example that is different from the configuration example shown in FIG. 12 and comprises units 13a, 13b, 13c (PDλ$_{p1}$-PDλ$_{p3}$) that monitor the intensity of excitation lights λ$_{p1}$-λ$_{p3}$ from respective excitation light sources 11a, 11b, 11c that are inputted into the optical fiber transmission channel 2.

Each of the monitoring units 13a, 13b, 13c has a photodiode 311 that detects an excitation light and converts the light into an electric current, a monitoring circuit 312 that converts the output of the photodiode 311 into voltage, and an analog-digital converter 313 that converts the voltage output of the monitoring circuit 312 into a digital signal.

With such a configuration, the drive signals of excitation light may be applied from the excitation light quantity calculation unit 15d to the digital-analog converters 111 (DAC1-DAC3) so that the monitored quantity of the excitation light intensity detected by the monitoring units 13a, 13b, 13c becomes the excitation light intensity Pp1-b, Pp2_b, Pp3_b that results from the gain deviation control. The digital-analog converters 111 (DAC1-DAC3) convert the drive signal supplied by the excitation light control circuit 15 into an analog component and then supply the analog component to an excitation light drive circuit 112 (DRVλ$_{p1}$-DRVλ$_{p3}$). The excitation light sources 113 (λ$_{p1}$-λ$_{p3}$) generate excitation light in response to the drive current supplied from the excitation light drive circuit 112 (DRVλ$_{p1}$-DRVλ$_{p3}$).

Figure 15:
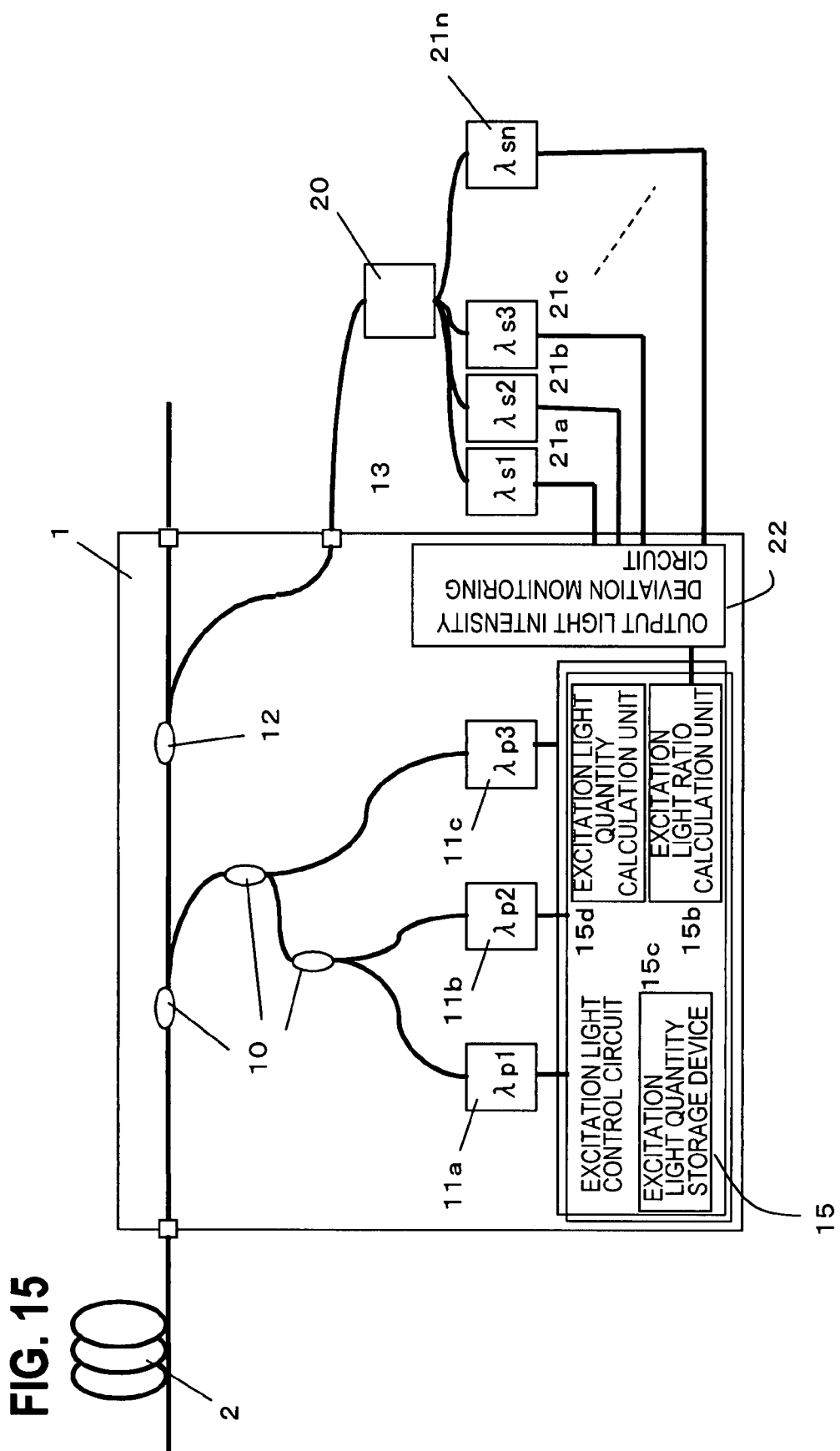
FIG. 15 shows yet another configuration example of the first embodiment.

As another configuration example of the first embodiment, the output light intensity deviation monitoring circuit 22 may be provided inside the optical amplification unit 1, in the same manner as the excitation light control circuit 15, as shown in FIG. 15.

Second Embodiment

The second embodiment of the present invention will be described below.

Figure 16:
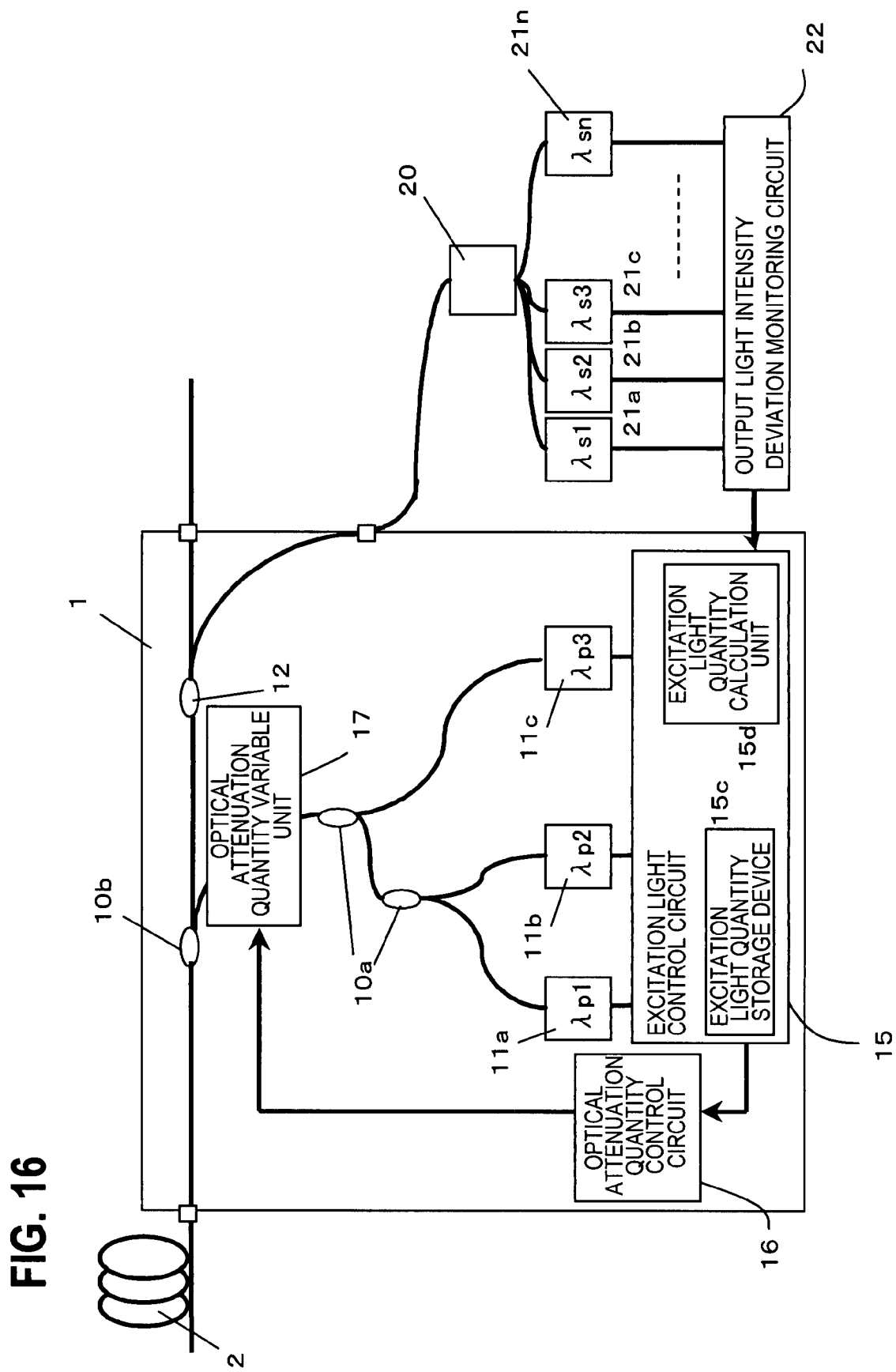
FIG. 16 illustrates a configuration example of the Raman amplifier of the second embodiment.

FIG. 16 shows the configuration of the second embodiment of the fiber Raman amplifier (FRA) contained in the optical transmission system shown in FIG. 9.

By contrast with the first embodiment shown in FIG. 10, the Raman amplifier shown in FIG. 16 comprises an optical attenuation quantity variable unit 17 between the multiplexing units 10a and 10b. Furthermore, a specific feature of the second embodiment is that the optical attenuation quantity variable unit 17 is controlled by the output of an optical attenuation quantity control circuit 16 connected to the excitation light control circuit 15.

Thus, FIG. 16 shows a configuration of a Raman amplifier that amplifies a signal light by using an optical fiber transmission channel 2, wherein an optical amplification unit 1 has a group of excitation light sources including excitation light sources 11a, 11b, 11c, multiplexing units 10a, 10b, a branching unit 12, and an excitation light control circuit 15 and further has the optical attenuation quantity control circuit 16 and optical attenuation quantity variable unit 17.

A signal light branching unit 20, signal light monitors 21a, 21b, . . . , 21n, and an output light intensity deviation monitoring circuit 22 are provided outside the optical amplification unit 1.

Similarly to the first embodiment, the group of excitation light sources comprises a plurality of excitation light sources 11a, 11b, 11c that have different wavelengths.

In the configuration of this mode for carrying out the invention, similarly to the first embodiment, the group of excitation light sources is assumed to be configured of three excitation light groups including the excitation light source 11a with a wavelength $\lambda_{P1}$, the excitation light source 11b with a wavelength $\lambda_{P2}$, and the excitation light source 11c with a wavelength $\lambda_{P3}$.

For example, the excitation lights n (n=1-3) $\lambda_{Pn}$ may be configured of a plurality of excitation light groups of similar wavelengths with a small difference between the wavelengths. Further, three groups of excitation light are considered, but the number of groups may be four or more.

Similarly to the first embodiment, the multiplexing unit 10a is a unit for gathering the excitation lights that are generated by the excitation light source group in one optical fiber. Similarly to the first embodiment, the multiplexing unit 10b is a unit that incident the excitation light into the optical fiber transmission path 2 where the signal light will be amplified.

Similarly to the first embodiment, the signal light monitors 21a, 21b, . . . , 21n have a function of detecting with the signal light monitors 21a, 21b, . . . , 21n the intensities of signal lights that are branched correspondingly to the wavelength with the signal light branching unit 20 after part of the signal light that passed through the optical fiber transmission channel 2 has been branched in the branching unit 12.

In the configuration example of the present invention, the signal light is branched into n components: $\lambda_{SIG1}, \lambda_{SIG2}, \ldots, \lambda_{SIGn}$ according to the wavelength.

The output light intensity deviation monitoring circuit 22 has an average value detection unit that finds an average value of the signal light intensity based on each signal light intensity detected with the signal light monitors 21a, 21b, . . . , 21n, and calculates the deviation quantity of signal light intensity for each signal light intensity by taking the difference with the average value of the signal light intensity found with the average value detection unit as "deviation".

The excitation light control circuit 15 comprises an excitation light quantity storage device 15c that stores the sum total quantity of excitation light power before the implementation of the gain deviation control and an excitation light quantity calculation unit 15d that performs control to the desired deviation quantity of signal light intensity based on the deviation quantity of signal light intensity calculated with the output light intensity deviation monitoring circuit 22.

The excitation light quantity storage unit 15c is a storage unit such as a memory that stores the sum total quantity of excitation light power before the implementation of the gain deviation control. The excitation light quantity calculation unit 15d calculates the excitation light quantity of each excitation light wavelength for which the intensity deviation of signal light becomes a predetermined property.

The optical attenuation quantity control circuit 16, which is a specific feature of the second embodiment, compares the excitation light quantity before the gain deviation control that was stored in the excitation light quantity storage device 15c and the excitation light quantity calculated during the implementation of the gain deviation control and calculates the optical attenuation quantity such that power identical to the sum total quantity of the excitation light power before the gain deviation control is incident into the optical fiber transmission channel.

The excitation light quantity after the gain deviation control that was calculated by the excitation light control circuit 15 and the optical attenuation quantity that was calculated by the optical attenuation quantity control circuit 16 are set in the excitation light source group and optical attenuation quantity control unit 17, respectively. As a result, the signal light intensity after Raman amplification can be controlled to a predetermined deviation, while maintaining the excitation light quantity incident into the optical fiber transmission channel 2.

As an example, the characteristic of the drive signal and optical attenuation quantity in the optical attenuation quantity variable unit 17 is stored in advance in a storage medium such as a memory, and the optical attenuation quantity may be controlled according to a set ratio of the excitation light power before and after the gain deviation control, and the excitation light power incident into the optical fiber transmission channel 2 may be controlled.

For example, a variable optical attenuator using an electrooptical effect according to which an optical attenuation quantity can be varied by an electric signal is used as the variable optical attenuator employed in the optical attenuation quantity variable unit 17. With the gain deviation control of the second embodiment, the power quantity is set for each excitation light wavelength at which the intensity deviation of the signal light becomes the predetermined characteristic, and the attenuation quantity of the optical attenuation quantity variable unit 17 is controlled so that the excitation light intensity incident into the optical fiber transmission channel 2 after the gain deviation control is maintained at a level equal to that before the gain deviation control, whereby the predetermined Raman gain of signal light is obtained.

Figure 17:
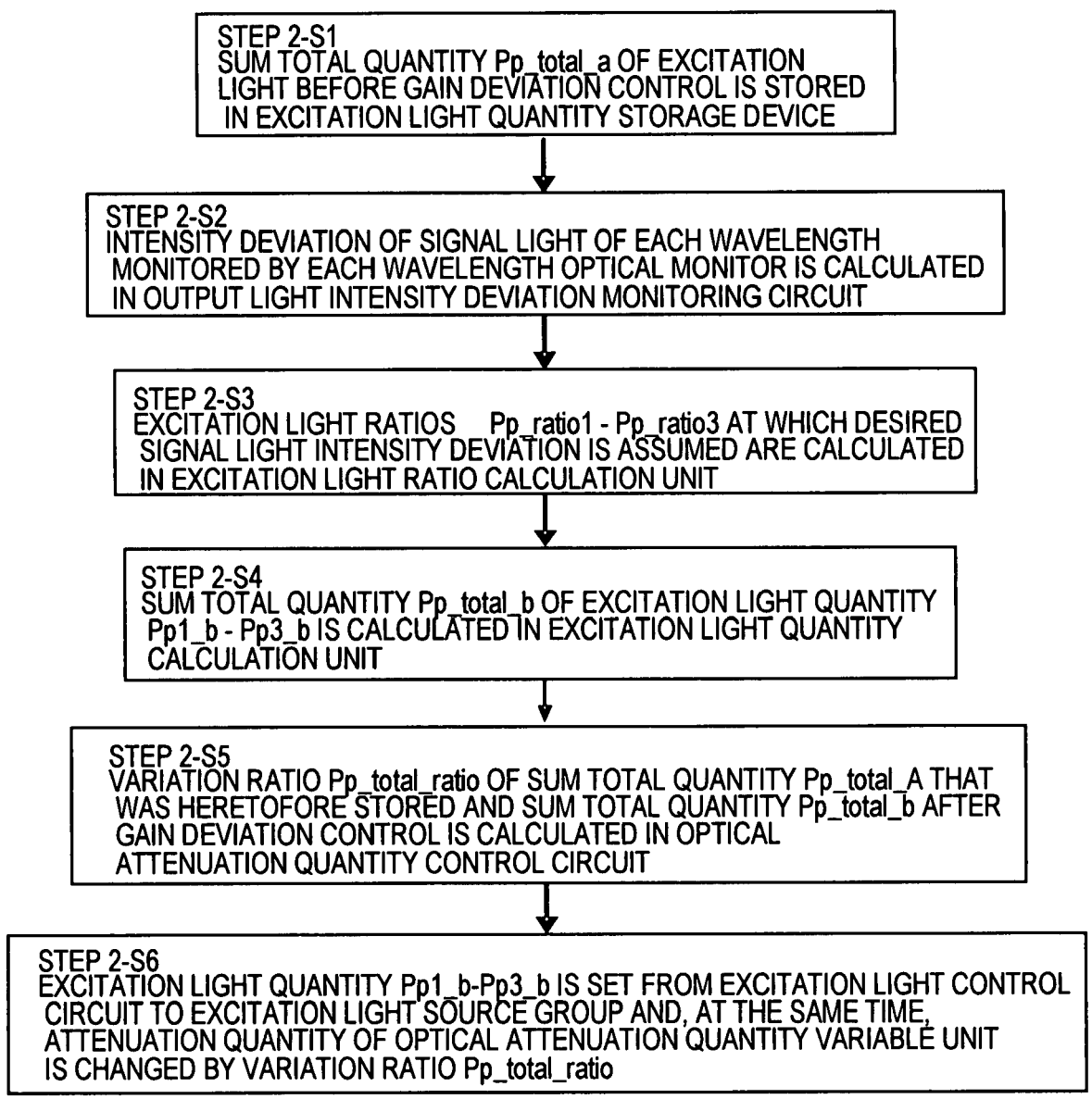
FIG. 17 illustrates the processing flow of a control unit of the second embodiment.

A processing sequence relating to the case of flattening the wavelength characteristic of signal light intensity in the configuration of the second embodiment will be explained below with reference to the flowchart shown in FIG. 17.

Step 2-S1: similarly to step 1-S1, a sum total quantity Pp_total_a of excitation light power that will be inputted to the transmission channel is held in the excitation light quantity storage device 15c that is a storage medium such as a memory, before the implementation of the gain deviation control.

The sum total quantity of the excitation light power before the implementation of the gain deviation control is represented by Formula (1) above.

Step 2-S2: similarly to step 1-S2, a deviation quantity of signal light intensity before the gain deviation control is found in the output light intensity deviation monitoring circuit 22.

The signal lights $\lambda_{SIG1}, \lambda_{SIG2}, \ldots, \lambda_{SIGn}$ are grouped into three blocks according to Raman amplification regions of excitation light 1, excitation light 2, excitation light 3, and the intensity deviations ΔPsig_BL1, ΔPsig_BL2, ΔPsig_BL3 of signal light of each block are represented by formulas (6), (7), (8) above.

Step 2-S3: the excitation light power quantity of excitation light 1, excitation light 2, excitation light 3 that flattens the wavelength characteristic of signal light intensity is calculated with the excitation light ratio calculation unit 15d.

Similarly to the first embodiment, the power Pp1_b, Pp2_b, Pp3_b of excitation light 1, excitation light 2, excitation light 3 after the gain deviation control is calculated by increasing or decreasing the power variation quantities ΔPp1, ΔPp2, ΔPp3 found with formula (13) to the excitation light power Pp1_a, Pp2_a, Pp3_a before the gain deviation control.

Step 2-S4: in the excitation light ratio computation unit 15b, the sum total quantity Pp_total_b of the excitation light power of excitation light 1, excitation light 2, excitation light 3 found in step 2-S3 is found from formula (14)

Step 2-S5: the variation ratio Pp_total_ratio of sum total quantities of excitation light power before and after the gain deviation control Pp_total_b and Pp_total_a is calculated from formula (15) in the optical attenuation quantity control circuit 16.

$$Pp\_total\_ratio = Pp\_total\_b / Pp\_total\_a \qquad (15)$$

An example of implementing the control in accordance with the present invention based on the deviation of signal light intensity in a dispersed shift fiber that was explained hereinabove will be explained below as a specific example of the second embodiment.

When the state before the gain deviation control is

Pp1_a=150 mW, Pp2_a=150 mW, Pp3_a=150 mW

ΔPsig_BL1=−0.4 dB, ΔPsig_BL2=+1.0 dB,
ΔPsig_BL3=−0.6 dB, as show in FIG. 6, FIG. 7, and FIG. 8, the signal light intensity at the short wavelength side and long wavelength side of the signal band is low, and the intensity in the vicinity of the signal band center is high, the excitation light power variation quantity for flattening the wavelength characteristic is calculated as ΔPp1=+54 mW, ΔPp2=−89 mW, ΔPp3=+63 mW.

In this case the power of each excitation light is calculated as

Pp1_b=204 mW, Pp2_b=61 mW, Pp3_b=213 mW.

Because the sum total quantity Pp_total_a of excitation light power before the gain deviation control that was earlier stored in the excitation light quantity storage device 15c is 450 mW and the sum total quantity Pp_total_b of excitation light power in the process of gain deviation control is 478 mW, the variation ratio Pp_total ratio of the sum total quantities of excitation light power before and after the gain deviation control is calculated in the manner as follows by using formula (15).

Pp_total ratio=10×log(Pp_total_b/Pp_total_a=10×log(478 mW/450 mW)=0.26 dB.

Step 2-S6: the power quantity of excitation light that was calculated in step 2-S3 is set for excitation light 1, excitation light 2, excitation light 3 of the excitation light source group and the attenuation quantity of the optical attenuation quantity variable unit 17 is controlled by the variation ratio calculated in step 2-S5 so that the sum total quantity of excitation light power that will be outputted from the excitation light source group and incident into the optical fiber transmission channel 2 will be the same before and after the gain deviation control.

In a specific example of step 2-S5, the excitation light power rises after the gain deviation control by the variation ratio Pp_total_ratio=0.26 dB of the excitation light power.

The optical attenuation quantity of the optical attenuation quantity variable unit 17 may be increased by 0.26 dB so that the excitation light power incident into the amplification medium such as the optical fiber transmission channel before and after the gain deviation control is better maintained at the same level.

Figure 18:
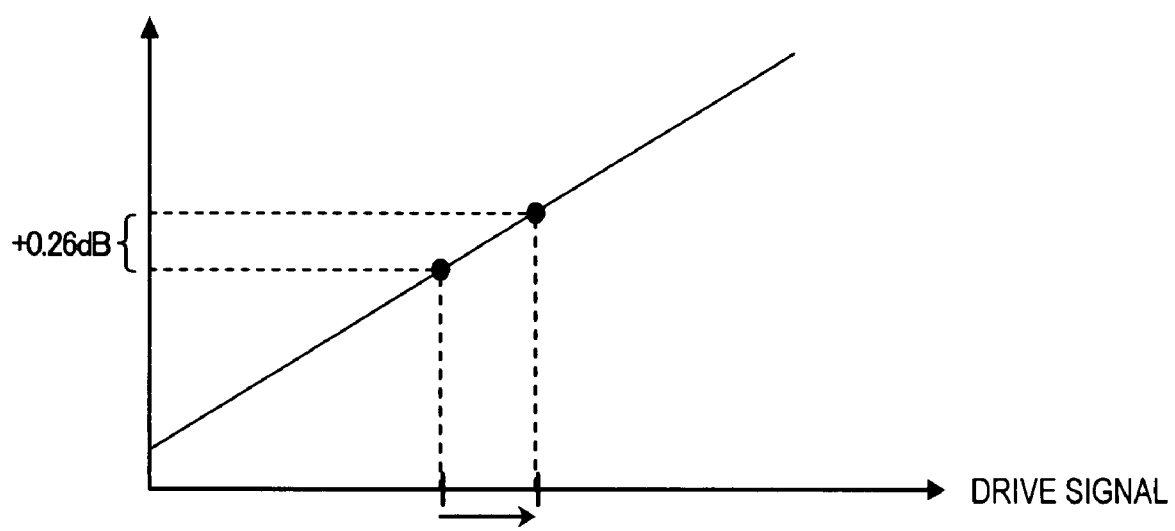
FIG. 18 shows an example of characteristic of a drive signal and light attenuation quantity of the light attenuation quantity variation unit.

FIG. 18 shows an example of a drive signal—optical attenuation quantity characteristic of the optical attenuation quantity variable unit 17.

As an example, of step 2-S6, the characteristic of the optical attenuation quantity variable unit 17 is stored in advance in a storage medium such as a memory. When the sum total quantity of excitation light power after the gain deviation control changes with respect to that before the gain deviation control, the optical attenuation quantity is controlled simultaneously with setting the excitation light power after the gain deviation control according to the ratio Pp_total_ratio of variation quantity.

For example, when the ratio Pp_total_ratio of variation quantity is 0.26 dB, as in the above-described specific example, the drive signal of the optical attenuation quantity variable unit 17 after the optical attenuation quantity was changed by 0.26 dB is calculated from the characteristic shown in FIG. 18. Further, the drive signal that was earlier calculated may be supplied to the optical attenuation quantity variable unit 17 and the optical attenuation quantity may be changed by 0.26 dB simultaneously with setting the excitation light power after the gain deviation control.

Figure 19:
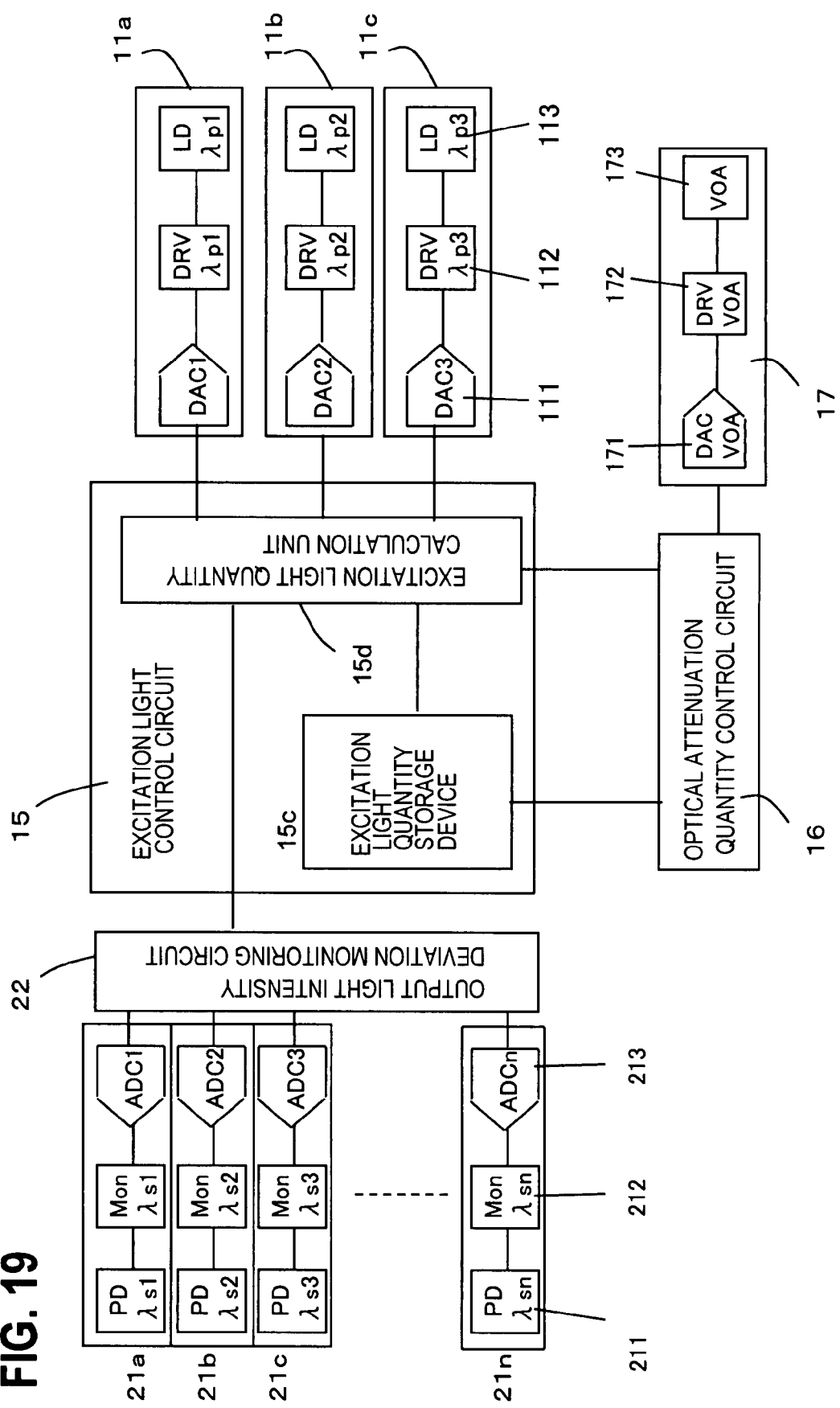
FIG. 19 shows a detailed configuration example of a signal light monitor in the optical amplifier an output light intensity deviation monitoring circuit, and an excitation light control circuit in the optical amplification unit of the second embodiment of the present invention as shown in FIG. 16.

FIG. 19 illustrates a detailed configuration example of the signal light monitors 21a, 21b-21n and output light intensity deviation monitoring circuit 22 in the optical amplifier in the optical amplifier in the second embodiment according to the present invention that is shown in FIG. 16, and also a detailed configuration example of the excitation light control circuit 15 in the optical amplification unit 1.

The configurations of the signal light monitors 21a, 21b-21n and output light intensity deviation monitoring circuit 22 and operation thereof are identical to those in the configuration example of the first embodiment illustrated by FIG. 12.

The excitation light control circuit 15 comprises an excitation light quantity storage device 15c and excitation light quantity calculation unit 15d.

In the excitation light quantity calculation unit 15d, the intensities Pp1_b, Pp2_b, Pp3_b of excitation light sources $\lambda_{p1}$-$\lambda_{p3}$ such as the desired intensity deviations are calculated from the signal light intensity deviation monitored by the output light intensity deviation monitoring circuit 22. The excitation light quantity storage device 15c stores the sum total quantity Pp_total_a of the excitation light intensity incident into the transmission channel before the gain deviation control.

The drive signals of excitation light sources are supplied to the digital-analog converter 111 (DAC1-DAC3), so as to obtain the excitation light intensities Pp1_b, Pp2_b, Pp3_b after the gain deviation control that were calculated with the excitation light control circuit 15.

The $\lambda_{p1}$, $\lambda_{p2}$, $\lambda_{p3}$ characteristic storage unit stores the correspondence relationships of the intensities of each excitation light $\lambda_{p1}$, $\lambda_{p2}$, $\lambda_{p3}$ inputted into the transmission channel, as shown in FIG. 13, and the drive signal of excitation light source, and the drive signal corresponding to the excitation light intensity calculated as a result of gain deviation control may be set to the digital-analog converter 111.

Further, a unit may be provided for monitoring the intensity of each excitation light source $\lambda_{p1}$-$\lambda_{p3}$ in the location before the optical attenuation quantity variable unit 17, and an excitation light drive signal may be supplied to the digital-analog converter 111 so that the monitored quantities of the excitation light intensity become Pp1_b, Pp2_b, Pp3_b as a result of the gain deviation control.

In the digital-analog converter 111, the drive signals supplied from the excitation light control circuit 15 are converted into analog components and then supplied to an excitation light drive circuit 112 (DRV$\lambda_{p1}$-DRV$\lambda_{p3}$) The excitation light sources 113 ($\lambda_{p1}$-$\lambda_{p3}$) generate excitation light in response to the drive current supplied from the excitation light drive circuit 112.

The optical attenuation quantity control circuit 16 compares the sum total quantity Pp_total_a of the excitation light intensity before the gain deviation control that was stored in the excitation light quantity storage device 15c and the sum total quantity Pp_total_b of the excitation light intensities Pp1_b, Pp2_b, Pp3_b after the gain deviation control that were calculated in the excitation light quantity calculation unit 15d and calculate the variation ratio Pp_total_ratio of the Pp_total_a and Pp_total_b.

The optical attenuation quantity control circuit 16 stores the relationship between the optical attenuation quantity and drive signals of the optical attenuator, such as shown in FIG. 18, in a storage medium such as a memory, and supplies a drive signal to a digital-analog converter 171 (DACVOA) constituting the optical attenuation quantity variable unit 17, so that the optical attenuation quantity varies according to the variation ratio Pp_total_ratio.

The digital-analog converter 171 converts the drive signal supplied from the optical attenuation quantity control circuit 16 into an analog component and supplies the analog component to an optical attenuator drive circuit 172 (DRVVOA). Then, the optical attenuator drive circuit 172 (VOA) changes the optical attenuation quantity according to the drive electric signal supplied from the optical attenuator drive circuit 172.

Figure 20:
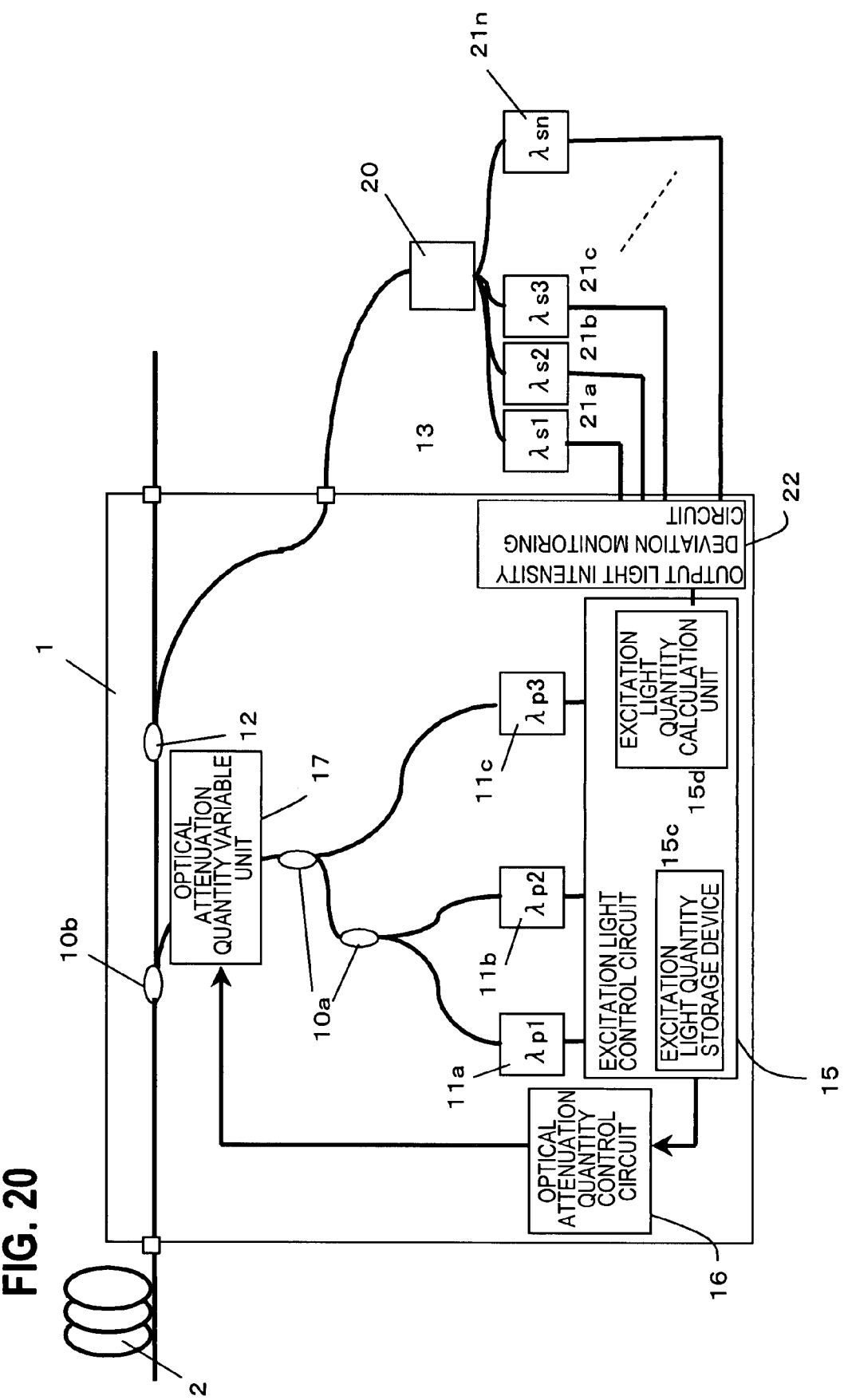
FIG. 20 illustrates yet another configuration example of the second embodiment.

As another configuration example of the second embodiment, as shown in FIG. 20, similarly to the excitation light control circuit 15, the output light intensity deviation monitoring circuit 22 may be configured so as to be provided inside the optical amplification unit 1.

Third Embodiment

A specific feature of the present invention is in the configuration of a fiber Raman amplifier (FRA) provided in each relay station in an optical transmission system such as shown in FIG. 9. The configuration of the third embodiment is shown in FIG. 21.

Figure 21:
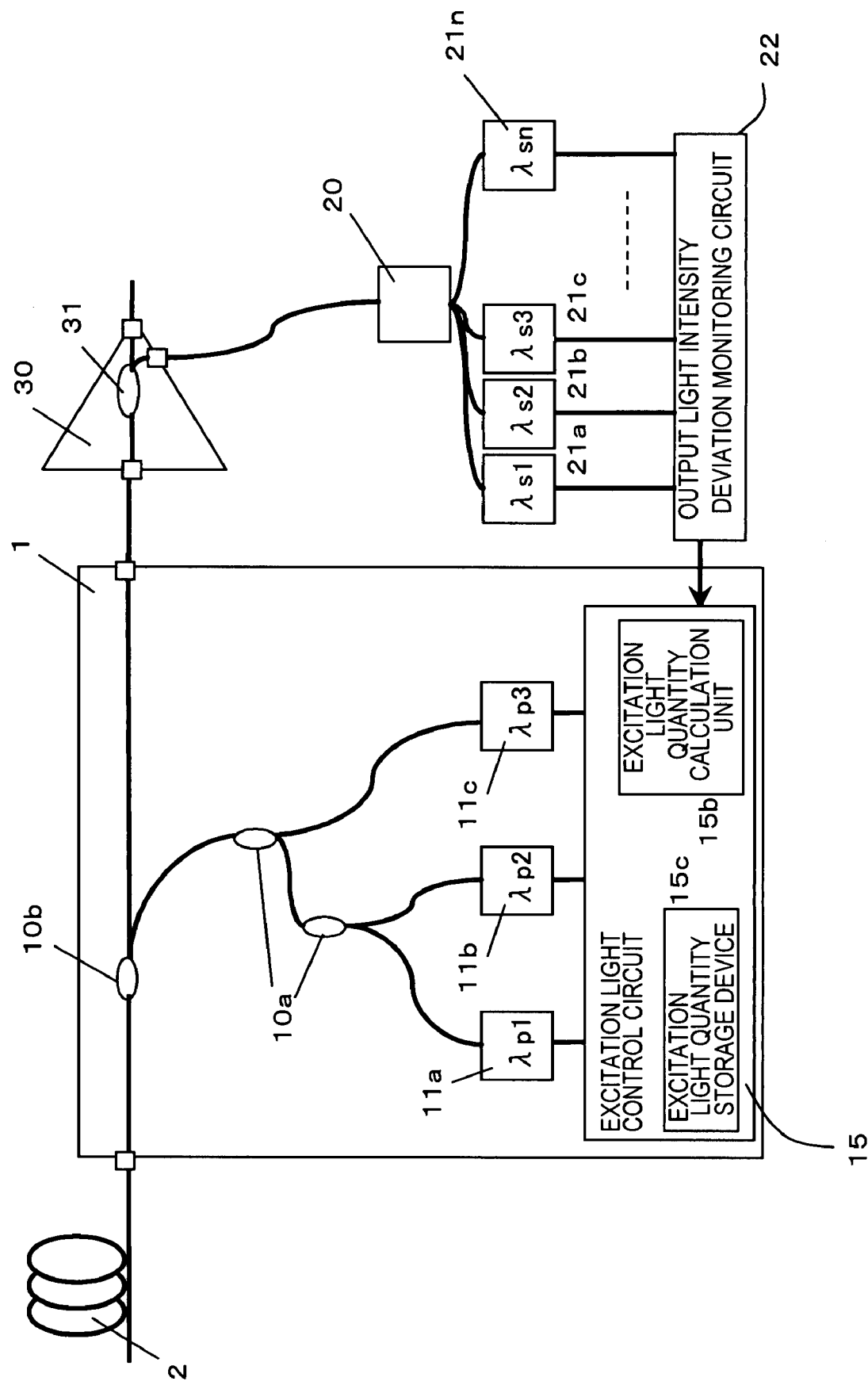
FIG. 21 shows a configuration example of the Raman amplifier in the third embodiment.

By contrast with the first embodiment shown in FIG. 10, in the configuration shown in FIG. 21, part of signal light amplified with the optical amplifier 30 connected in series to the output of the Raman amplification unit 1 is branched and signal light intensity for each wavelength is detected in the signal light monitors 21a, 21b, . . . , 21n. A specific feature of the third embodiment is the configuration in which the deviation of signal light intensity generated by superposition of optical amplification performed by the Raman amplification unit 1 and optical amplifier 30 is monitored by the output light intensity deviation monitoring circuit 22 and the excitation light source group is controlled by the excitation light control circuit 15.

FIG. 21 shows a configuration of a Raman amplifier that amplifies a signal light by using an optical fiber transmission channel 2, wherein an optical amplification unit 1 has a group of excitation light sources including excitation light sources 11a, 11b, 11c, multiplexing units 10a, 10b, a branching unit 12, and an excitation light control circuit 15. A signal light branching unit 20, signal light monitors 21a, 21b, . . . , 21n, and an output light intensity deviation monitoring circuit 22 are provided outside the optical amplification unit 1. Furthermore, there are provided the optical amplifier 30 connected in series to the output of the Raman amplification unit 1 and a branching unit 31 that branches part of the signal light after optical amplification with the optical amplifier 30.

Similarly to the first embodiment, the group of excitation light sources comprises a plurality of excitation light sources 11a, 11b, 11c that have different wavelengths.

In the configuration of this mode for carrying out the invention, similarly to the first embodiment, the group of excitation light sources is assumed to be configured of three excitation light groups including the excitation light source 11a with a wavelength $\lambda_{P1}$, the excitation light source 11b with a wavelength $\lambda_{P2}$, and the excitation light source 11c with a wavelength $\lambda_{P3}$.

For example, the excitation lights n (n=1-3) $\lambda_{Pn}$ may be configured of a plurality of excitation light groups of similar wavelengths with a small difference between the wavelengths. Further, three groups of excitation light are considered, but the number of groups may be four or more.

Similarly to the first embodiment, the multiplexing unit 10a is a unit for gathering the excitation lights that are generated by the excitation light source group in one optical fiber. Similarly to the first embodiment, the multiplexing unit 10b is a unit that incident the excitation light into the optical fiber transmission path 2 where the signal light will be amplified.

Similarly to the first embodiment, the signal light monitors 21a, 21b, . . . , 21n have a function of detecting with the signal light monitors 21a, 21b, . . . , 21n the intensities of signal lights that are branched correspondingly to the wavelength with the signal light branching unit 20 after part of the signal light that passed through the optical fiber transmission channel 2 has been branched in the branching unit 12.

In the configuration example of the present invention, the signal light is branched into n components: $\lambda_{SIG1}, \lambda_{SIG2}, \ldots, \lambda_{SIGn}$ according to the wavelength.

The output light intensity deviation monitoring circuit 22 calculates the deviation quantity of signal light intensity as a difference with the average value of signal light intensity, based on each signal light intensity detected with the signal light monitors 21a, 21b-21n.

The excitation light control circuit 15 comprises an excitation light quantity storage device 15c that stores the sum total quantity of excitation light power before the implementation of the gain deviation control and an excitation light ratio calculation unit 15b that performs control to the desired deviation quantity of signal light intensity based on the intensity deviation quantity calculated with the output light intensity deviation monitoring circuit 22.

The excitation light quantity storage unit 15c comprises a storage medium such as a memory that stores the sum total quantity of excitation light power before the implementation of the gain deviation control. The excitation light ratio calculation unit 15b calculates the power ratio of each excitation light wavelength for which the intensity deviation of signal light becomes a predetermined property. The excitation light control circuit 15 has a function of distributing the excitation light ratio calculated in the excitation light ratio calculation unit 15b to a sum total quantity of excitation light power stored in the excitation light quantity storage unit 15c and setting the power quantity of each excitation light wavelength.

A specific feature of the third embodiment is that, by contract with the first embodiment, the deviation of signal light intensity induced by superposition of optical amplification with the Raman amplification unit 1 and the optical amplifier 30 connected in series thereto is set to the predetermined property and the Raman gain of signal light is maintained at a constant level, without increasing or decreasing the sum total quantity of excitation light power after the gain deviation control with respect to that before the gain deviation control.

Figure 11:
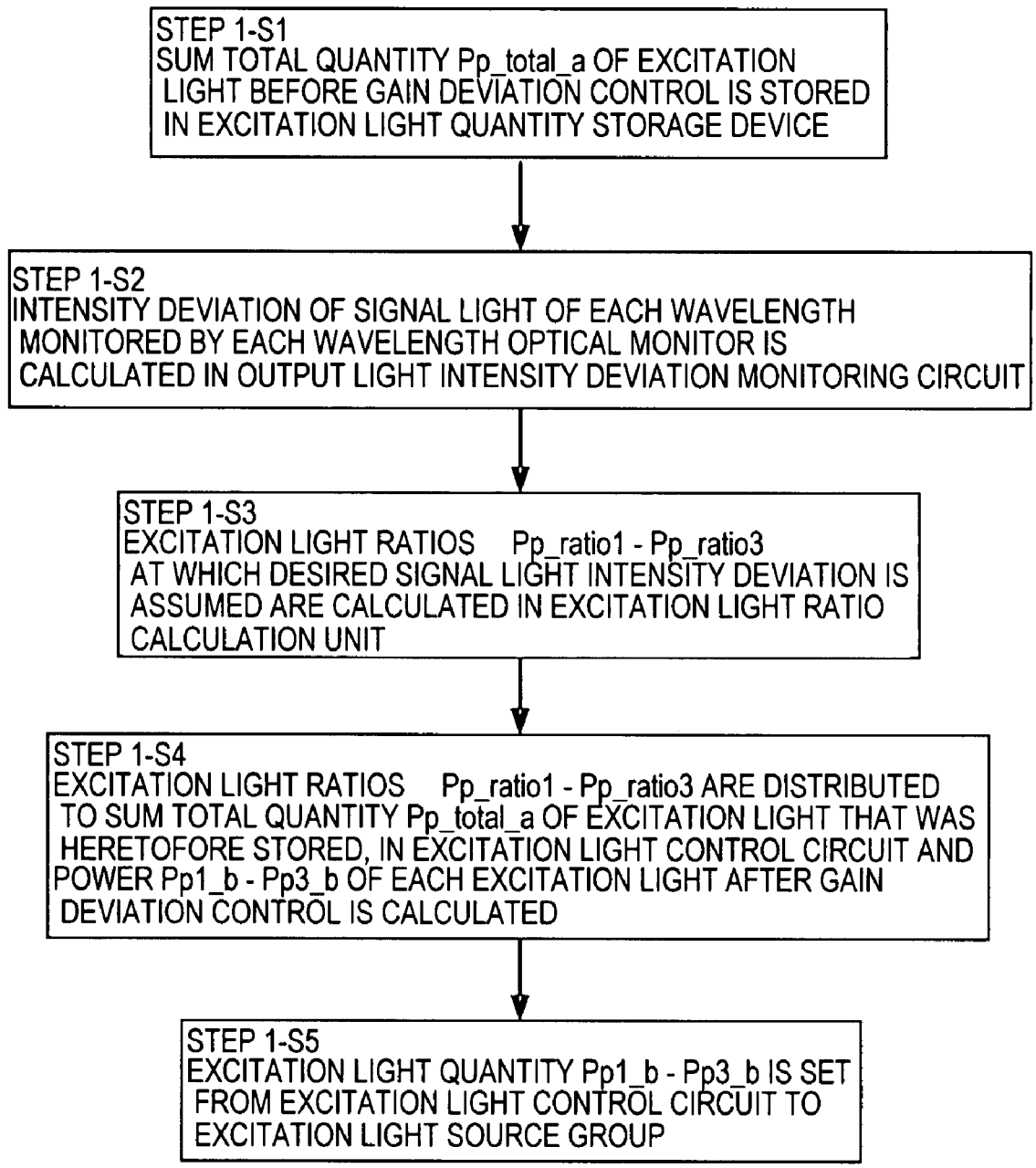
FIG. 11 illustrates the processing flow of a control unit of the first embodiment.

A processing sequence relating to the case of flattening the wavelength characteristic of signal light intensity in the configuration of the third embodiment is implemented in the same manner as shown in the flowchart of FIG. 11.

Figure 22:
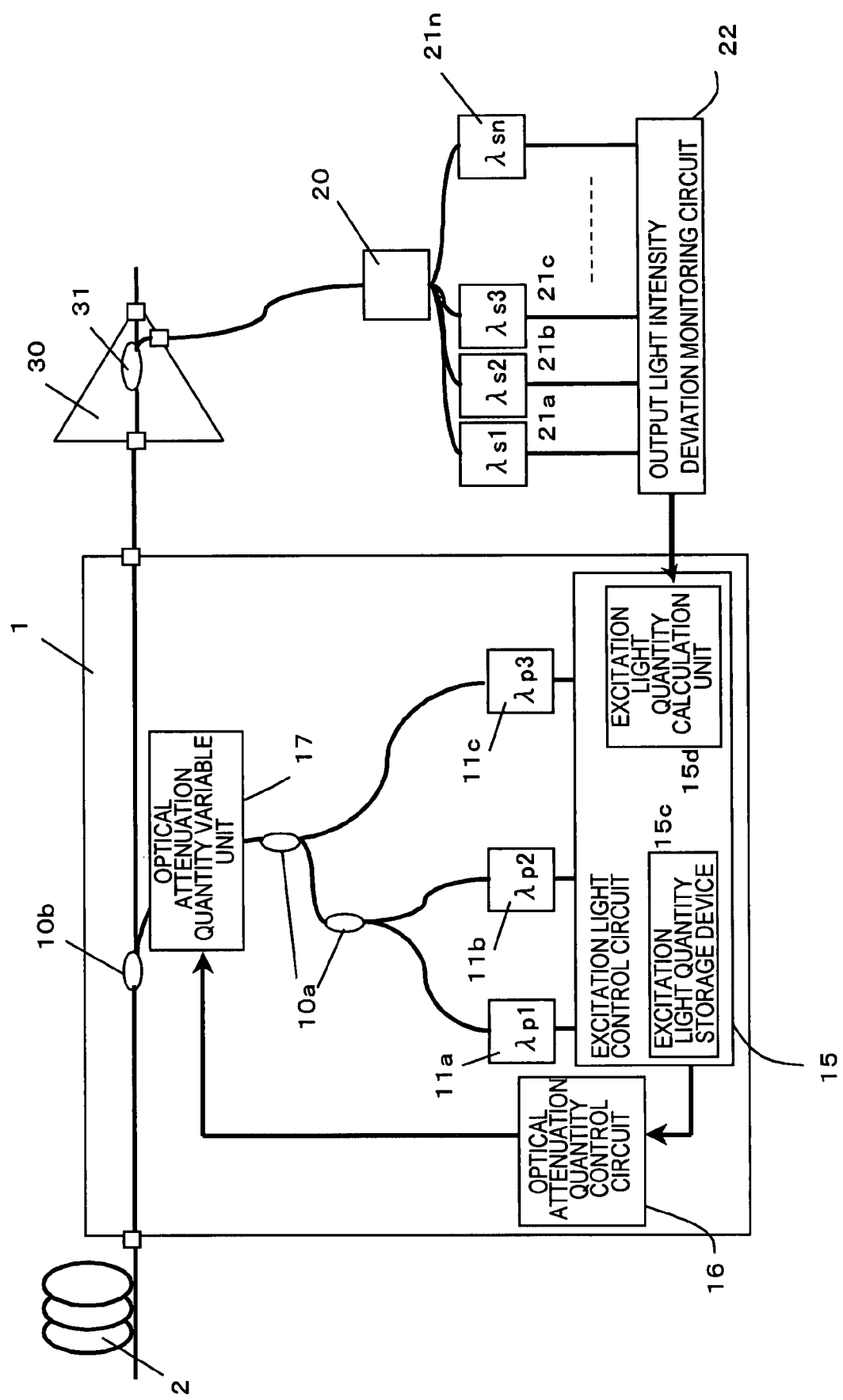
FIG. 22 shows another configuration example of the third embodiment.

In another configuration example of the third embodiment, as shown in FIG. 22, the Raman amplification unit 1 may be configured to comprise the attenuation quantity control circuit 16 and the optical attenuation quantity variable unit 17 that were explained in the second embodiment. In such another configuration example of the third embodiment, the processing sequence relating to the case of flattening the wavelength characteristic of signal light intensity is implemented in the same manner as shown in the flowchart of FIG. 17.

As described above, in the first embodiment of the present invention, the power ratio of signal light of each wavelength is distributed to the sum total quantity of excitation light power that was held before the gain deviation control, and each excitation light power after the gain deviation control is set. As a result, the deviation of signal light power after Raman amplification can be suppressed and the gain deviation control that maintains the Raman gain of signal light at a constant level can be implemented without increasing or decreasing the sum total quantity of excitation light power after the gain deviation control with respect to that before the gain deviation control.

Further, in the second embodiment of the present invention the sum total quantity of excitation light power that was held before the gain deviation control is compared with the sum total quantity of excitation light power calculated by the gain deviation control. A drive signal of an optical amplification quantity variable unit that changes the optical amplification quantity by the ratio of sum total quantities of excitation light power before and after the gain deviation control is calculated. By setting the excitation light power after the gain deviation control and simultaneously supplying a drive signal that was previously calculated to the optical attenuation quantity variable unit, a gain deviation control can be implemented such that the deviation of signal light power after Raman amplification is inhibited and the Raman gain of signal light is maintained at a constant level.

Further, in the third embodiment of the present invention, the gain deviation control is implemented with respect to the output light of the optical amplifier connected to the Raman amplification unit of the configuration example of the first embodiment or second embodiment. As a result, a gain deviation control can be implemented such that the deviation of signal light intensity induced by superposition of Raman amplification unit and optical amplification by the optical amplifier is inhibited and the Raman gain of signal light is maintained at a constant level, without increasing or decreasing the sum total quantity of excitation light power after the gain deviation control with respect to that before the gain deviation control.

What is claimed is:

1. A Raman amplifier, comprising:
    a light source unit that supplies lights of a plurality of wavelengths to an optical fiber transmission channel and performs Raman amplification;
    a signal light monitor that monitors an intensity of a signal light of each wavelength contained in an input signal light;
    an output light intensity deviation monitoring circuit that finds a deviation in the intensity of each signal light detected by the signal light monitor; and
    a light control circuit that controls a light intensity from light sources of each wavelength constituting the light source unit based on the deviation of the intensity of signal light found by the output light intensity deviation monitoring circuit, wherein
    the light control circuit has a storage unit that stores a sum total quantity of light intensities of wavelengths before implementing control of light intensity, and
    the light control circuit controls the light intensity from light sources of each wavelength by distributing the sum total quantity of light intensities stored in the storage unit according to a deviation ratio of intensities of signal lights found in the output light intensity deviation monitoring circuit.

2. A Raman amplifier, comprising:
    a Raman amplification unit having a light source unit that supplies lights of a plurality of wavelengths to an optical fiber transmission channel and performs Raman amplification, and a light control circuit that controls a light emission intensity of the light with respect to the light source unit;
    a signal light monitor that monitors an intensity of a signal light of each wavelength contained in a signal light that is Raman amplified; and
    an output light intensity deviation monitoring circuit that finds a deviation in the intensity of each signal light detected by the signal light monitor, wherein
    the light control circuit of the Raman amplification unit has a storage unit that stores a sum total quantity of light intensities of wavelengths before implementing control of light intensity, and
    the light control circuit controls the light intensity from light sources of each wavelength by distributing the sum total quantity of light intensities stored in the storage unit according to a deviation ratio of intensities of signal lights found in the output light intensity deviation monitoring circuit.

3. An optical amplifier, comprising:
    a light source unit that supplies lights of a plurality of wavelengths to an optical fiber transmission channel and performs Raman amplification;
    a signal light monitor that monitors an intensity of a signal light of each wavelength contained in a signal light that is Raman amplified;
    an output light intensity deviation monitoring circuit that finds a deviation in the intensity of each signal light detected by the signal light monitor; and
    a light control unit that controls a light intensity from light sources of each wavelength constituting the light source unit based on the deviation of the intensity of signal light found by the output light intensity deviation monitoring circuit;
    a storage device that stores a sum total quantity of light intensities of wavelengths before implementing control of light intensity;
    a variable optical attenuator disposed between the light source unit and the optical fiber transmission channel; and
    an optical attenuation quantity control circuit that controls an attenuation quantity of the variable optical attenuator so as to limit the light intensity supplied from the light source unit to the optical fiber transmission channel to the sum total quantity of light intensities stored in the storage device.

4. The Raman amplifier according to claim 1, further comprising an optical amplifier connected in series to a downstream side of the optical fiber transmission channel that transmits the signal light,
    wherein the signal light monitor monitors the intensity of signal light of each wavelength contained in an output of the optical amplifier.

5. The Raman amplifier according to claim 2, further comprising an optical amplifier connected in series to a downstream side of the optical fiber transmission channel that transmits the signal light,
    wherein the signal light monitor monitors the intensity of signal light of each wavelength contained in an output of the optical amplifier.

6. The Raman amplifier according to claim 3, further comprising an optical amplifier connected in series to a downstream side of the optical fiber transmission channel that transmits the signal light,
wherein the signal light monitor monitors the intensity of signal light of each wavelength contained in an output of the optical amplifier.

7. An optical communication system, comprising:
an optical fiber transmission channel; and
a plurality of Raman amplifiers disposed in the optical fiber transmission channel, wherein each of the plurality of Raman amplifiers comprises:
   a light source unit that supplies lights of a plurality of wavelengths to the optical fiber transmission channel and performs Raman amplification;
   a signal light monitor that monitors an intensity of a signal light of each wavelength contained in a signal light that is Raman amplified;
   an output light intensity deviation monitoring circuit that finds a deviation in the intensity of each signal light detected by the signal light monitor; and
   a light control circuit that controls a light intensity from light sources of each wavelength constituting the light source unit based on the deviation of the intensity of signal light found by the output light intensity deviation monitoring circuit, wherein
   the light control circuit has a storage unit that stores a sum total quantity of light intensities of wavelengths before implementing control of light intensity, and
   the light control circuit controls the light intensity from light sources of each wavelength by distributing the sum total quantity of light intensities stored in the storage unit according to a deviation ratio of intensities of signal lights found in the output light intensity deviation monitoring circuit.

8. An optical communication system, comprising:
an optical fiber transmission channel; and
a plurality of Raman amplifiers disposed in the optical fiber transmission channel, wherein each of the plurality of Raman amplifiers comprises:
   a Raman amplification unit having a light source unit that supplies lights of a plurality of wavelengths to an optical fiber transmission channel and performs Raman amplification, and a light control circuit that controls a light emission intensity of the light with respect to the light source unit;
   a signal light monitor that monitors an intensity of a signal light of each wavelength contained in a signal light that is Raman amplified; and
   an output light intensity deviation monitoring circuit that finds a deviation in the intensity of each signal light detected by the signal light monitor, wherein
   the light control circuit of the Raman amplification unit has a storage unit that stores a sum total quantity of light intensities of wavelengths before implementing control of light intensity, and
   the light control circuit controls the light intensity from light sources of each wavelength by distributing the sum total quantity of light intensities stored in the storage unit according to a deviation ratio of intensities of signal lights found in the output light intensity deviation monitoring circuit.

9. An optical communication system, comprising:
an optical fiber transmission channel; and
a plurality of Raman amplifiers disposed in the optical fiber transmission channel, wherein each of the plurality of Raman amplifiers comprises:
   a light source unit that supplies lights of a plurality of wavelengths to an optical fiber transmission channel and performs Raman amplification;
   a signal light monitor that monitors an intensity of a signal light of each wavelength contained in a signal light subjected to Raman amplification;
   an output light intensity deviation monitoring circuit that finds a deviation in an intensity of each signal light detected by the signal light monitor;
   a light control unit that controls a light intensity from light sources of each wavelength constituting the light source unit based on a deviation of the intensity of signal light found by the output light intensity deviation monitoring circuit;
   a storage device that stores a sum total quantity of light intensities of wavelengths before implementing control of light intensity;
   a variable optical attenuator disposed between the light source unit and the optical fiber transmission channel; and
   an optical attenuation quantity control circuit that controls an attenuation quantity of the variable optical attenuator so as to limit the light intensity supplied from the light source unit to the optical fiber transmission channel to the sum total quantity of light intensities stored in the storage device.

10. The optical communication system according to claim 7, further comprising an optical amplifier connected in series to a downstream side of the optical fiber transmission channel that transmits the signal light,
wherein each signal light monitor monitors the intensity of signal light of each wavelength contained in an output of the optical amplifier.

11. The optical communication system according to claim 8, further comprising an optical amplifier connected in series to a downstream side of the optical fiber transmission channel that transmits the signal light,
wherein each signal light monitor monitors the intensity of signal light of each wavelength contained in an output of the optical amplifier.

12. The optical communication system according to claim 9, further comprising an optical amplifier connected in series to a downstream side of the optical fiber transmission channel that transmits the signal light,
wherein each signal light monitor monitors the intensity of signal light of each wavelength contained in an output of the optical amplifier.

13. A method for controlling light intensity in a Raman amplifier that amplifies a signal light intensity by using a Raman amplification effect of an optical fiber transmission channel, the method comprising:
   storing in advance a sum total of light intensities of each of a plurality of wavelengths in a storage unit;
   detecting a signal light intensity of each wavelength contained in a signal light that is Raman amplified;
   finding a deviation in the intensity of each detected signal light; and
   controlling a light intensity from a light source of each wavelength constituting a light source unit based on the found deviation of the intensity of signal light, wherein
   the light intensity from light sources of each wavelength is controlled by distributing the sum total quantity of light intensities stored in the storage unit according to a deviation ratio of found intensities of signal lights.

14. A method for controlling excitation light intensity in a Raman amplifier that amplifies a signal light intensity by using a Raman amplification effect of an optical fiber transmission channel, the method comprising:
- storing in advance a sum total quantity of light intensities of each of a plurality of wavelengths to be multiplexed in a storage unit;
- detecting each intensity of signal lights of each wavelength contained in a signal light subjected to Raman amplification;
- finding a deviation in the intensity of each detected signal light;
- controlling a light intensity from a light source of each wavelength constituting a light source unit based on the found deviation of the intensity of signal light; and:
- attenuating a light from a light source for which the light intensity is controlled so as to obtain a sum total quantity of light intensities stored in the storage unit and supplying the attenuated light to the optical fiber transmission channel.

* * * * *